(12) United States Patent
Eadelson

(10) Patent No.: US 11,462,786 B2
(45) Date of Patent: Oct. 4, 2022

(54) SYSTEMS AND METHODS FOR THERMAL REGULATION

(71) Applicant: ZUTA-CAR LTD., Hof Ashkelon (IL)

(72) Inventor: Nahshon Eadelson, Moshav Sde-Avraham (IL)

(73) Assignee: ZUTA-CAR LTD., Hof Ashkelon (IL)

( * ) Notice: Subject to any disclaimer, the term of this patent is extended or adjusted under 35 U.S.C. 154(b) by 150 days.

(21) Appl. No.: 16/492,451

(22) PCT Filed: Mar. 8, 2018

(86) PCT No.: PCT/IL2018/050269
§ 371 (c)(1),
(2) Date: Sep. 9, 2019

(87) PCT Pub. No.: WO2018/163180
PCT Pub. Date: Sep. 13, 2018

(65) Prior Publication Data
US 2020/0052356 A1    Feb. 13, 2020

Related U.S. Application Data

(60) Provisional application No. 62/468,977, filed on Mar. 9, 2017.

(51) Int. Cl.
| H01M 10/6569 | (2014.01) |
| H01M 10/613 | (2014.01) |
| H01M 10/6568 | (2014.01) |
| H01M 10/6556 | (2014.01) |
| H01M 10/625 | (2014.01) |

(52) U.S. Cl.
CPC ..... *H01M 10/6569* (2015.04); *H01M 10/613* (2015.04); *H01M 10/6556* (2015.04); *H01M 10/6568* (2015.04); *H01M 10/625* (2015.04); *H01M 2220/20* (2013.01)

(58) Field of Classification Search
CPC .......... H01M 10/6569; H01M 10/613; H01M 10/6556; H01M 10/6568; H01M 10/625; H01M 2220/20; H01B 7/423; Y02E 60/10
See application file for complete search history.

(56) References Cited

U.S. PATENT DOCUMENTS

| 3,736,364 A | 5/1973 | Kubo |
| 3,946,142 A | 3/1976 | Kellow et al. |
| 3,962,529 A | 6/1976 | Kubo |
| 5,909,099 A | 6/1999 | Watanabe et al. |
| 6,106,972 A | 8/2000 | Kokubo et al. |
| 6,526,768 B2 | 1/2003 | Wall et al. |
| 2012/0003516 A1* | 1/2012 | Eisenhour ........... H01M 10/617 429/62 |
| 2012/0183830 A1 | 7/2012 | Schaefer et al. |
| 2015/0100180 A1 | 6/2015 | Oyori et al. |
| 2015/0180100 A1 | 6/2015 | Blackwelder et al. |
| 2015/0311572 A1* | 10/2015 | Sung ...................... B60L 58/21 429/62 |
| 2016/0200206 A1 | 7/2016 | Woo et al. |
| 2016/0204488 A1 | 7/2016 | Arai et al. |
| 2016/0330873 A1 | 11/2016 | Farshchian et al. |
| 2017/0115066 A1* | 4/2017 | Adomat ............... F28D 1/0476 |
| 2019/0063848 A1* | 2/2019 | Miller .................... F28F 13/06 |

FOREIGN PATENT DOCUMENTS

| DE | 2150113 A1 | 4/1972 |
| DE | 2554650 A1 | 6/1977 |
| DE | 102009006426 A1 | 7/2010 |
| DE | 102010033188 A1 | 2/2012 |
| DE | 102013208369 A1 | 11/2014 |
| EP | 2887447 A1 | 6/2015 |
| FR | 2337453 A1 | 7/1977 |
| GB | 612482 A | 11/1948 |
| GB | 2295264 A | 5/1996 |
| WO | 2017028033 A1 | 2/2017 |

OTHER PUBLICATIONS

International Search Report in related PCT Application No. PCT/IL2018/050269, dated Jun. 10, 2018 (5 pages).
International Preliminary Report on Patentability with Written Opinion in related PCT Application No. PCT/IL2018/050269, dated Sep. 10, 2019 (8 pages).

* cited by examiner

*Primary Examiner* — Muhammad S Siddiquee
(74) *Attorney, Agent, or Firm* — Lathrop GPM LLP; James H. Velema, Esq.; Gordon R. Moriarty, Esq.

(57) ABSTRACT

The present disclosure provides methods and systems for regulating the temperature of energy storage devices and cables. Systems for regulating the temperature of energy storage devices and cables may include one or more of a cooling unit, isolating unit, evaporator, and microchannel evaporators. Systems may further comprise condensers and one or more fluid flow lines. During use, liquid coolant may be directed to the cooling unit, isolating unit, evaporator, or microchannel evaporators, which may be in thermal communication with the energy storage device or cable. Thermal energy may transfer from the energy storage device or cable to the liquid coolant and the liquid coolant may undergo phase transition to a vapor coolant. The vapor coolant may be directed to the condenser and undergo another phase transition to regenerate the liquid coolant.

10 Claims, 11 Drawing Sheets

SYSTEMS AND METHODS FOR THERMAL REGULATION

CROSS-REFERENCE TO RELATED APPLICATIONS

This application is a 35 U.S.C. § 371 filing of International Patent Application No. PCT/IL2018/050269, filed Mar. 8, 2018, which claims priority to U.S. Provisional Patent Application No. 62/468,977, filed on Mar. 9, 2017, which are entirely incorporated herein by reference.

BACKGROUND

Advances in electrical technologies, such as electrical and hybrid cars, intermittent energy sources (e.g., solar, wind, and wave energy), and personal electronic devices, have increased the use and demand for batteries and other energy storage devices. Charging and discharging of energy storage devices generates heat that may reduce the performance of the energy storage device and associated electronics. For example, charging and discharging rate may be increased by increasing voltage and/or amperage of the energy source, which in turn may generate excess heat. The excess heat may reduce charging, discharging, and energy storage efficiency and, over multiple charge and discharge cycles, may reduce the lifetime of the energy storage device.

Battery efficiency (e.g., charging, discharging, and storage efficiency) may be increased by regulating the temperature of the battery and battery components. For example, the resistance of a charging able may be increased as the temperature of the cable increases. Therefore, cooling the charging cable may decrease the resistance and permit the charging efficiency of the energy storage system to increase.

SUMMARY

As recognized herein, finding effective thermal solutions for energy storage devices and electronic systems may be of interest to reduce cost and provide increased performance. The present disclosure provides cost effective and continuously operating thermal regulation and management systems and methods, which may operate to provide rapid thermal management of electronic devices or systems. This may be useful, for example, in regulating and maintaining a temperature of a thermal energy source (e.g., heat source), such as, e.g., energy storage devices and charging systems.

In an aspect, the present disclosure provides a method for thermal regulation of an energy storage device, comprising: providing an energy storage device comprising one or more cells, a liquid coolant reservoir containing a liquid coolant, a cooling unit in fluid communication with the liquid coolant reservoir, a fluid flow line in fluid communication with the cooling unit, and a condenser in fluid communication with the fluid flow line and the liquid coolant reservoir, wherein the one or more cells are disposed internal to the cooling unit such that the one or more cells are at least partially submerged within the liquid coolant; transferring thermal energy from the one or more cells to the liquid coolant in the cooling unit such that at least a portion of the liquid coolant undergoes a phase transition to a vapor coolant; directing the vapor coolant along the fluid flow line to the condenser; and using the condenser to permit the vapor coolant to expel thermal energy and undergo phase transition to the liquid coolant, which liquid coolant is directed to the liquid coolant reservoir.

In some embodiments, the liquid coolant reservoir, the cooling unit, the fluid flow line, and the condenser are part of a closed circulatory fluid flow path. In some embodiments, the fluid flow line comprises only the vapor coolant. In some embodiments, the method further comprises activating a control loop that controls a pressure of the vapor coolant in the fluid flow line. In some embodiments, the control loop generates a pressure differential between the cooling unit and the condenser such that a first pressure at the cooling unit is less than a second pressure at the condenser. In some embodiments, the method further comprises activating a flow generator that directs fluid from the condenser to the liquid coolant reservoir.

In some embodiments, the method further comprises using a shut-off valve to control a level of the liquid coolant in the liquid coolant reservoir. In some embodiments, the shut-off valve is self-regulating. In some embodiments, the shut-off valve is controlled by a controller. In some embodiments, the method further comprises activating a heating unit that provides thermal energy to the liquid coolant to heat the one or more cells.

In another aspect, the present disclosure provides a system for thermal regulation of an energy storage device, comprising: a liquid coolant reservoir configured to contain a liquid coolant; a cooling unit in fluid communication with the liquid coolant reservoir and thermal communication with the energy storage device comprising one or more cells, wherein the one or more cells are disposed internal to the cooling unit such that the one or more cells are at least partially submerged within the liquid coolant, and wherein the cooling unit is configured to permit transfer of thermal energy from the one or more cells to the liquid coolant such that at least a portion of the liquid coolant undergoes a phase transition to a vapor coolant; a fluid flow line in fluid communication with the cooling unit, wherein the fluid flow line is configured to accept the vapor coolant from the cooling unit; and a condenser in fluid communication with the fluid flow line and the liquid coolant reservoir, wherein the condenser is configured to permit the vapor coolant to expel thermal energy and undergo phase transition to the liquid coolant.

In some embodiments, the energy storage device is a solid state battery. In some embodiments, the system further comprises a closed circulatory fluid flow path comprising the liquid coolant reservoir, cooling unit, fluid flow line, and condenser. In some embodiments, the one or more cells comprise gaps or spacers between individual cells of the one or more cells, and wherein, during use, the liquid coolant and/or the vapor coolant flows within the gaps or spacers.

In some embodiments, the system further comprises a flow restrictor in fluid communication with the liquid coolant reservoir and the condenser, and wherein the flow restrictor regulates flow of the liquid coolant from the condenser towards the liquid coolant reservoir. In some embodiments, the system further comprises a shut-off valve in fluid communication with the liquid coolant reservoir and the condenser, and wherein the shut-off valve regulates a level of liquid coolant in the liquid coolant reservoir. In some embodiments, the system further comprises a heating element in thermal communication with the cooling unit, wherein the heating element provides thermal energy to the one or more cells. In some embodiments, the system further comprises a control loop in fluid communication with the cooling unit and the fluid flow line, and wherein the control loop actively controls a pressure of the vapor coolant in the fluid flow line. In some embodiments, the control loop generates a pressure differential between the cooling unit and the condenser such that a first pressure at the cooling unit is less than a second pressure at the condenser. In some embodiments, the system further comprises a vacuum generator in fluid communication with the fluid flow line, and wherein the vacuum generator regulates flow of the vapor coolant from the cooling unit to the condenser.

In another aspect, the present disclosure provides a method for thermal regulation of an energy storage device, comprising: providing an energy storage device comprising one or more cells, a liquid coolant reservoir containing a liquid coolant, a plurality of microchannel evaporators in fluid communication with the liquid coolant reservoir and thermal communication with the energy storage device comprising the one or more cells, a fluid flow line in fluid communication with the plurality of microchannel evaporators, and a condenser in fluid communication with the fluid flow line and the liquid coolant reservoir; transferring thermal energy from the one or more cells to the liquid coolant in the plurality of microchannel evaporators such that at least a portion of the liquid coolant undergoes a phase transition to a vapor coolant; directing the vapor coolant along the fluid flow line to the condenser; and using the condenser to permit the vapor coolant to expel thermal energy and undergo phase transition to the liquid coolant, which liquid coolant is directed to the liquid coolant reservoir.

In some embodiments, the liquid coolant reservoir, the plurality of microchannel evaporators, the fluid flow line, and the condenser are part of a closed circulatory fluid flow path. In some embodiments, the fluid flow line comprises only the vapor coolant. In some embodiments, the method further comprises activating a control loop that controls a pressure of the vapor coolant in the fluid flow line. In some embodiments, the control loop generates a pressure differential between the plurality of microchannel evaporators and the condenser such that a first pressure at the plurality of microchannel evaporators is less than a second pressure at the condenser. In some embodiments, the method further comprises activating a flow generator that directs fluid from the condenser to the liquid coolant reservoir.

In some embodiments, the method further comprises using a shut-off valve to control a level of the liquid coolant in the liquid coolant reservoir. In some embodiments, the shut-off valve is self-regulating. In some embodiments, the shut-off valve is controlled by a controller. In some embodiments, the method further comprises activating a heating unit that provides thermal energy to the liquid coolant to heat the one or more cells.

In another aspect, the present disclosure provides a system for thermal regulation of an energy storage device, comprising: a liquid coolant reservoir configured to contain a liquid coolant; a plurality of microchannel evaporators in fluid communication with the liquid coolant reservoir and thermal communication with the energy storage device comprising one or more cells, wherein the plurality of microchannel evaporators is configured to permit transfer of thermal energy from the one or more cells to the liquid coolant such that at least a portion of the liquid coolant undergoes a phase transition to a vapor coolant; a fluid flow line that is in fluid communication with the plurality of microchannel evaporators, wherein the fluid flow line is configured to accept the vapor coolant from the plurality of microchannel evaporators; and a condenser in fluid communication with the fluid flow line and the liquid coolant reservoir, wherein the condenser is configured to permit the vapor coolant to expel thermal energy and undergo phase transition to the liquid coolant.

In some embodiments, the energy storage device is a solid state battery. In some embodiments, the system further comprises a closed circulatory fluid flow path comprising the liquid coolant reservoir, plurality of microchannel evaporators, fluid flow line, and condenser. In some embodiments, one or more microchannel evaporators of the plurality of microchannel evaporators are disposed between individual cells of the one or more cells.

In some embodiments, the system further comprises a flow restrictor in fluid communication with the liquid coolant reservoir and the condenser, and wherein the flow restrictor regulates flow of the liquid coolant from the condenser towards the liquid coolant reservoir. In some embodiments, the system further comprises a shut-off valve in fluid communication with the liquid coolant reservoir and the condenser, and wherein the shut-off valve regulates a level of liquid coolant in the liquid coolant reservoir. In some embodiments, the system further comprises a heating element in thermal communication with the plurality of microchannel evaporators, wherein the heating element provides thermal energy to the one or more cells. In some embodiments, the system further comprises a control loop in fluid communication with the plurality of microchannel evaporators and the fluid flow line, and wherein the control loop actively controls a pressure of the vapor coolant in the fluid flow line. In some embodiments, the control loop generates a pressure differential between the plurality of microchannel evaporators and the condenser such that a first pressure at the plurality of microchannel evaporators is less than a second pressure at the condenser. In some embodiments, the system further comprises a vacuum generator in fluid communication with the fluid flow line, and wherein the vacuum generator regulates flow of the vapor coolant from the plurality of microchannel evaporators to the condenser.

In another aspect, the present disclosure provides a method for thermal regulation of an energy storage device, comprising: providing an energy storage device comprising one or more cells, an evaporator comprising a surface that is in thermal communication with the one or more cells, a fluid flow line in fluid communication with the evaporator, and a condenser in fluid communication with the fluid flow line and the evaporator; transferring thermal energy from the one or more cells to the liquid coolant in the evaporator such that at least a portion of the liquid coolant undergoes a phase transition to yield a vapor coolant in a space adjacent to the liquid coolant and disposed away from the surface of the evaporator in thermal communication with the one or more cells; directing the vapor coolant along the fluid flow line to the condenser; and using the condenser to permit the vapor coolant to expel thermal energy and undergo phase transition to the liquid coolant, which liquid coolant is directed to the evaporator.

In some embodiments, the evaporator, the fluid flow line, and the condenser are part of a closed circulatory fluid flow path. In some embodiments, the fluid flow line comprises only the vapor coolant. In some embodiments, the method further comprises activating a control loop that controls a pressure of the vapor coolant in the fluid flow line. In some embodiments, the method further comprises activating a flow generator that directs fluid from the condenser to the evaporator. In some embodiments, the control loop generates a pressure differential between the evaporator and the condenser such that a first pressure at the evaporator is less than a second pressure at the condenser.

In some embodiments, the method further comprises using a shut-off valve to control a level of the liquid coolant in the evaporator. In some embodiments, the shut-off valve is self-regulating. In some embodiments, the shut-off valve is controlled by a controller. In some embodiments, the method further comprises activating a heating unit that provides thermal energy to the liquid coolant to heat the one or more cells.

In another aspect, the present disclosure provides a system for thermal regulation of an energy storage device, comprising: an evaporator configured to contain a liquid coolant and a vapor coolant, wherein the evaporator comprises a surface that is in thermal communication with one or more cells of the energy storage device, and wherein the evaporator is configured to permit transfer of thermal energy from the one or more cells to the liquid coolant such that at least a portion of the liquid coolant in the evaporator undergoes a phase transition to yield a vapor coolant in a space adjacent to the liquid coolant and disposed away from the surface; a fluid flow line that is in fluid communication with the evaporator, wherein the fluid flow line is configured to accept the vapor coolant from the space; and a condenser in fluid communication with the fluid flow line and the evaporator, wherein the condenser is configured to permit the vapor coolant to expel thermal energy and undergo phase transition to the liquid coolant.

In some embodiments, the energy storage device is a solid state battery. In some embodiments, the system further comprises a closed circulatory fluid flow path comprising the evaporator, fluid flow line, and condenser. In some embodiments, the surface is not parallel to a direction of a gravitational acceleration vector. In some embodiments, the one or more cells are fully submerged in the liquid coolant. In some embodiments, the evaporator is adjacent to a long dimension of the one or more cells. In some embodiments, the evaporator is adjacent to a short dimension of the one or more cells.

In some embodiments, the system further comprises a flow restrictor in fluid communication with the evaporator and the condenser, and wherein the flow restrictor regulates flow of the liquid coolant from the condenser towards the evaporator. In some embodiments, the system further comprise a shut-off valve in fluid communication with the evaporator and the condenser, and wherein the shut-off valve regulates a level of liquid coolant in the evaporator. In some embodiments, the system further comprises a heating element in thermal communication with the evaporator, wherein the heating element provides thermal energy to the one or more cells. In some embodiments, the system further comprises a control loop in fluid communication with the evaporator and the fluid flow line, and wherein the control loop actively controls a pressure of the vapor coolant in the fluid flow line. In some embodiments, the control loop generates a pressure differential between the evaporator and the condenser such that a first pressure at the evaporator is less than a second pressure at the condenser. In some embodiments, the system further comprises a vacuum generator in fluid communication with the fluid flow line, and wherein the vacuum generator regulates flow of the vapor coolant from the evaporator to the condenser.

In another aspect, the present disclosure provides a method for thermal regulation of a cable, comprising: providing a cable, an isolating unit comprising a liquid coolant inlet and a vapor coolant outlet, a fluid flow line in fluid communication with the isolating unit, and a condenser in fluid communication with the fluid flow line and the isolating unit, wherein the isolating unit is disposed along a long dimension of the cable, and wherein the isolating unit is in thermal communication with the cable along the long dimension; transferring thermal energy from the cable to the liquid coolant in the isolating unit such that at least a portion of the liquid coolant undergoes a phase transition to a vapor coolant; directing the vapor coolant along the fluid flow line to the condenser; and using the condenser to permit the vapor coolant to expel thermal energy and undergo phase transition to the liquid coolant, which liquid coolant is directed to the liquid coolant reservoir.

In some embodiments, the isolating unit, the fluid flow line, and the condenser are part of a closed circulatory fluid flow path. In some embodiments, the fluid flow line comprises only the vapor coolant. In some embodiments, the method further comprises activating a control loop that controls a pressure of the vapor coolant in the fluid flow line. In some embodiments, the method further comprises activating a flow generator that directs fluid from the condenser to the isolating unit. In some embodiments, the control loop generates a pressure differential between the isolating unit and the condenser such that a first pressure at the isolating unit is less than a second pressure at the condenser.

In another aspect, the present disclosure provides a system for thermal regulation of a cable, comprising: an isolating unit comprising a liquid coolant inlet and a vapor coolant outlet, wherein the isolating unit is disposed along a long dimension of a cable, wherein the isolating unit is in thermal communication with the cable along the long dimension, and wherein the isolating unit is configured to permit transfer of thermal energy from the cable to a liquid coolant such that at least a portion of the liquid coolant undergoes a phase transition to a vapor coolant; a fluid flow line that is in fluid communication with the isolating unit, wherein the fluid flow line is configured to accept the vapor coolant from the isolating unit; and a condenser in fluid communication with the fluid flow line and the isolating unit, wherein the condenser is configured to permit the vapor coolant to expel thermal energy and undergo phase transition to the liquid coolant.

In some embodiments, the cable is a charging cable. In some embodiments, the system further comprises a closed circulatory fluid flow path comprising the isolating unit, fluid flow line, and condenser. In some embodiments, at least a portion of the isolating unit is disposed internal to the cable. In some embodiments, at least a portion of the isolating unit is wrapped around the electrical cable. In some embodiments, the system further comprises a drip line in fluid communication with the isolating unit and the condenser.

In an aspect the present disclosure provides a system for thermal regulation of one or more heat emitting devices, comprising: one or more restrictors configured to restrict a flow of a liquid coolant through said one or more restrictors; one or more cooling interfaces in fluid communication with said one or more restrictors and thermal communication with one or more heat emitting devices, wherein said one or more cooling interfaces are configured to permit transfer of thermal energy from said one or more heat emitting devices to a liquid coolant such that at least a portion of said liquid coolant undergoes a phase transition to a vapor coolant; a fluid flow line in fluid communication with said one or more cooling interfaces and said one or more restrictors, wherein said fluid flow line is configured to accept said vapor coolant from said one or more cooling interfaces; and a condenser in fluid communication with said fluid flow line and said one or more restrictors, wherein said condenser is configured to permit said vapor coolant to expel thermal energy and undergo phase transition to said liquid coolant.

In some embodiments, the one or more cooling interfaces comprise one or more cooling units, microchannel evaporators, evaporators, and/or isolating units. In some embodiments, the one or more cooling interfaces are arranged in a parallel configuration, a series configuration, or in both a parallel or series configuration. In some embodiments, each of the one or more cooling interfaces is in direct fluid contact with at least one of the one or more restrictors. In some embodiments, the one or more cooling interfaces and the condenser are part of a control loop that provides a pressure differential between the one or more cooling interfaces and the condenser such that a first pressure at said one or more cooling interfaces is less than a second pressure differential at the condenser. In some embodiments, the one or more cooling interfaces are arranged in a parallel configuration.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

FIG. 1A illustrates an air-based thermal regulation system; FIG. 1B illustrates a liquid-based thermal regulation system;

FIG. 4A shows a thermal regulation system with battery cells submerged in a liquid coolant within a cooling unit; FIG. 4B shows a top-down view of cylindrical battery cells submerged in a liquid coolant within a cooling unit;

FIG. 5A shows an example thermal regulation system for battery cells; FIG. 5B shows a top-down view of a thermal regulation system comprising prismatic-type battery cells and microchannel evaporators; FIG. 5C shows a top-down view of a thermal regulation system comprising cylindrical battery cells and microchannel evaporators;

FIG. 6A shows a thermal regulation system with a long dimension of the battery cells parallel to a long dimension of the evaporator; FIG. 6B shows a thermal regulation system with a long dimension of the battery cells orthogonal to a long dimension of the evaporator;

FIG. 7A shows a thermal regulation system with a liquid coolant internal to the cable; FIG. 7B shows a thermal regulation system with a liquid coolant external to the cable.

DETAILED DESCRIPTION

Figure 1A:
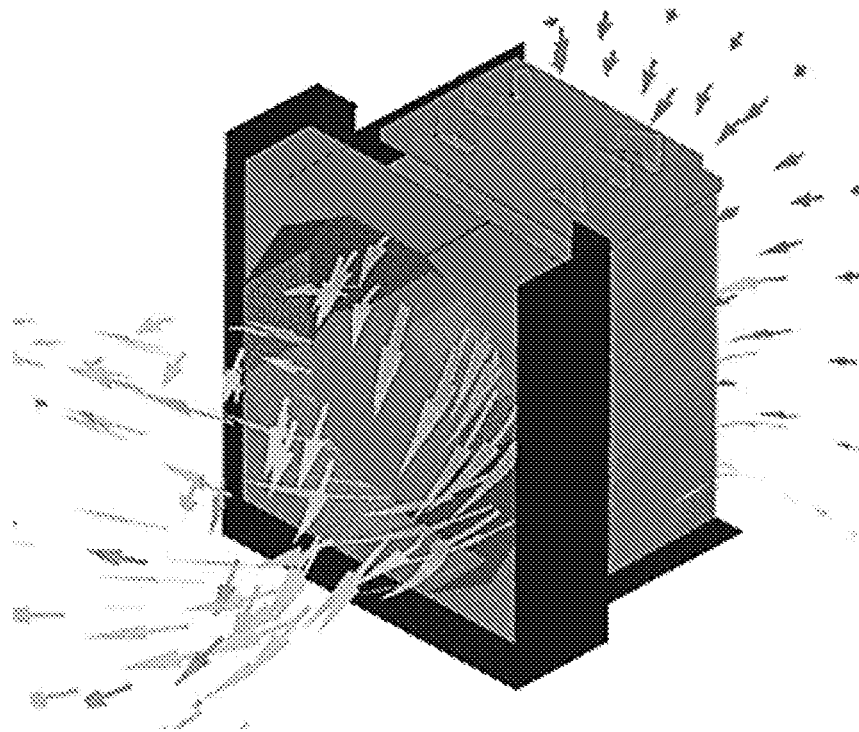
FIGS. 1A and 1B illustrate example single phase thermal regulation systems.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

As used herein, the term "condenser" generally refers to any device in which a vapor coolant is condensed to form a liquid coolant. The condenser may subject a vapor to undergo a phase change (or transition) to a liquid (i.e., condensation). For example, the condenser may condense a vapor coolant to a liquid coolant by altering the temperature of the coolant or the pressure of an environment containing the coolant. Heat removed from the coolant may be stored within the condenser or transmitted from the condenser, such as emitted from the condenser (e.g., using heat fins). Heat may be emitted to the surrounding free air environment of may be transferred to another heating, cooling, or thermal energy transfer device. The transfer of thermal energy may be achieved actively (e.g., by a fan attached to the condenser).

As used herein, the term "evaporator" generally refers to any unit operation that may absorb thermal energy from a heat source (e.g., a cell of an energy storage device) or provide thermal energy to a heat sink. An evaporator may be an enclosure, container, plate, or housing configured to contain a liquid coolant, vapor coolant, or combination of vapor and liquid coolants. The evaporator may contain a pool or layer of liquid coolant. An evaporator may be in direct contact with a source of thermal energy (e.g., heat source) or indirect contact with a source of thermal energy. Indirect contact may be provided by an interface, mediator, or other heat conducting method (e.g., heat pipe or cooling pipe).

As used herein, the term "microchannel evaporator" generally refers to any device that may absorb thermal energy from a heat source (e.g., a cell of an energy storage device) or provide thermal energy to a heat sink. The microchannel evaporator may subject a liquid to undergo a phase change (or transition) to a gas (i.e., evaporation). A microchannel evaporator may be formed by two plates or surfaces disposed in a parallel orientation with a spacing or gap between them. The two plates may be positioned with one end in fluid communication with a liquid coolant and another end in fluid communication with a vapor coolant. The plates or surfaces may comprise a material with a high thermal conductivity. A microchannel evaporator may be in direct contact with a source of thermal energy (e.g., heat source) or indirect contact with a source of thermal energy. Indirect contact may be provided by an interface, mediator, or other heat conducting method (e.g., heat pipe or cooling pipe). In some examples, the microchannel evaporator has one or more channels with dimensions on the order of nanometers, micrometers, or millimeters.

As used herein, the term "cooling unit" generally refers to any device containing a liquid coolant and source of thermal energy. The source of thermal energy may be partially or wholly contained within the cooling unit. The source of thermal energy may be disposed within the cooling unit such that the source of thermal energy is at least partially submerged within the liquid coolant. In an example, the source of thermal energy may be fully submerged within the liquid coolant. The cooling unit may include a container and the container may be sealed around the source of thermal energy. For example, the source of thermal energy may be cells of an energy storage device and the cells may be submerged in a liquid coolant and sealed within the cooling unit.

As used herein, the term "isolating unit" generally refers to any device that may absorb thermal energy from a heat source (e.g., an electrical charging cable) or provide energy to a heat sink. An isolating unit may be a hose, tube, pipe, or enclosure that comprises a liquid coolant inlet and a vapor coolant outlet. An isolating unit may be shaped like a hose and may have a cable threaded through it. An isolating unit may have a circular, square, rectangular, polygonal, or any other cross-sectional shape. An isolating unit may have multiple sections or compartments. The sections or compartments may hold a liquid coolant, vapor coolant, or any combination of a liquid coolant and a vapor coolant. For example, an isolating unit may comprise a hose or pipe with a larger diameter disposed external and around a hose or pipe with a smaller diameter. The pipe with the smaller diameter may flow a liquid coolant and the pipe with the larger diameter may flow a vapor coolant or vice versa.

As used herein, the term "fluid" generally refers to a liquid or a gas. A fluid may not maintain a defined shape and may flow during an observable time frame to fill a container in which it is put. Thus, the fluid may have any suitable viscosity that permits flow. If two or more fluids are present, each fluid may be independently selected among essentially any fluid (liquids, gases, and the like).

As used herein, the term "coolant" generally refers to a substance, such as a liquid or a vapor (e.g., gas), that may be used to reduce, increase, or regulate the temperature of a source of thermal energy. The coolant can either maintain a phase or may undergo a phase transition during cooling, heating, or temperature regulation. In an example, the coolant may undergo a phase transition from a liquid phase to a gas phase to increase the cooling efficiency of the coolant.

As used herein, the terms "channel," "line," and "path," may be used interchangeably and generally refer to a feature on or in a device or system that may at least partially direct flow of a fluid. A channel, line, or path may have any cross-sectional shape (e.g., circular, oval, triangular, irregular, square, rectangular, etc.). A channel, line, or path may be of any suitable length. The channel, line, or path may be straight, substantially straight, or may contain one or more bends, curves, or branches.

As used herein, the term "flow generator" generally refers to a mechanism for directing a fluid through a channel. The flow generator may be a pump(s), a compressor(s), an eductor or any other device that directs the flow of a fluid (e.g., liquid or vapor coolant). The flow generator may direct fluid flow in a pressurized, atmospheric, or vacuum system. In an example, the flow generator generates a vacuum in the system that facilitates fluid flow. The vacuum may be at a pressure of less than about 1 atmosphere (atm), or less than or equal to about 0.9 atm, 0.8 atm, 0.7 atm, 0.6 atm, 0.5 atm, 0.1 atm, 0.01 atm, 0.001 atm, or less.

As used herein, the term "vacuum generator" generally refers to any device that generates or induces vacuum through an active process (e.g., vacuum pump). A vacuum generator may include, but is not limited to, a diaphragm pump, a rotary vane pump, a piston pump, a scroll pump, screw pump, or roots blower.

The present disclosure provides systems and methods for the transfer of thermal energy. Systems and methods of the present disclosure may be employed for use in various settings, such as for use in the thermal regulation and transfer of thermal energy for electronic systems (e.g. computer processors, computer servers, data centers, or network systems), energy storage systems (e.g., solid state batteries), charging systems, three dimensional (3D) printing systems, manufacturing systems, and wearable devices.

Thermal Regulation and Transfer of Thermal Energy

Thermal management or thermal regulation of electronic devices, including energy storage devices and charging devices, may increase the efficiency, longevity, and performance of such devices. For example, thermal regulation of an energy storage device (e.g., battery) may increase the number of charge and discharge cycles the energy storage device is capable of completing, increase the charge capacity of the energy storage device, increase charge and discharge rate, and reduce the potential for device failure (e.g., thermal runaway). Systems and methods for thermal regulation and transfer of thermal energy may include passive thermal regulation and active thermal regulation. Passive thermal regulation may include thermal regulation that does not use additional energy to provide thermal regulation. For example, passive thermal regulation of a device may include incorporating design features into the device that increase dissipation of thermal energy, such as heat sinks, heat spreaders, and heat pipes. Active thermal regulation may include thermal regulation that uses additional energy to augment the thermal regulation process. In some examples, the active thermal regulation may be provided by an external device (e.g., a fan). Methods of active thermal management may include forced air cooling, forced liquid cooling, solid-state heat pumps, and multiphase cooling.

Figure 1B:
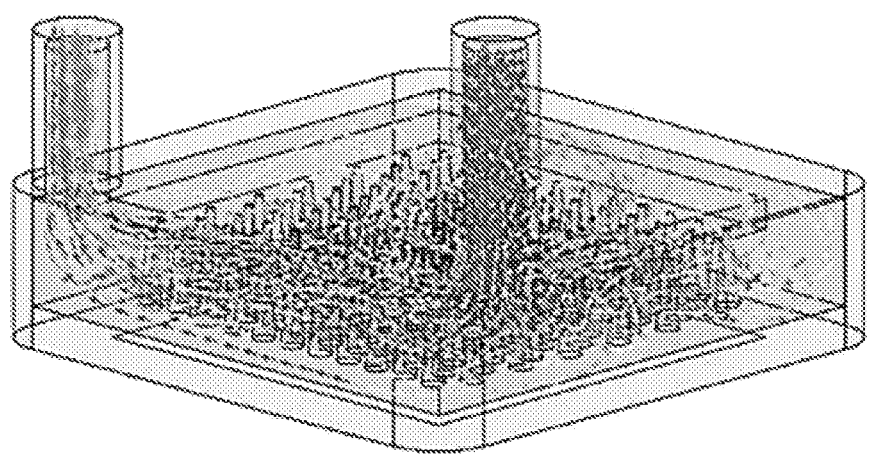

FIGS. 1A and 1B illustrate example single phase thermal regulation systems using a forced fluid. FIG. 1A shows an air-based thermal regulation system and FIG. 1B shows a liquid-based thermal regulation system. Single phase, force fluid (e.g., liquid or gas) thermal regulation systems may have limited cooling capabilities due to the ambient temperature in which the system operates. For example, an air-based single phase cooling system may not be capable of cooling a source of thermal energy below the ambient temperature due to the rate of heat transfer being proportional to the temperature gradient, as defined by Fourier's law. Thermal regulation systems may use cooled or chilled fluids to achieve cooling below ambient temperatures. The use of chilled fluids may inefficient as compared to a multiphase thermal regulation system.

Multiphase thermal regulation systems may use latent heat from a phase transition (e.g., from liquid to vapor) to cool below ambient temperatures. A multiphase thermal regulation system may be a two phase thermal regulation system. A two phase thermal regulation system may comprise a liquid and a gas phase or more than one liquid phase. Multiphase thermal regulation systems may be high pressure systems or low pressure systems. High pressure systems may be operated at pressures above about 3 atmospheres (atm). High pressure systems may include a gas or vapor that undergoes forced condensation (e.g., using pressures greater than 10 atm) followed by evaporation via a pressure decrease (e.g., using pressures less than about 3 atm). The evaporation process may occur adjacent to a source of thermal energy and the latent heat used to convert the fluid from a liquid to a vapor may draw thermal energy from the source of thermal energy and, therefore, cool the source of thermal energy. High pressure multiphase thermal regulation systems may have a large form factor, use ridged materials, and have robust sealing mechanism due to the high pressure (e.g., greater than 10 atm) of the system.

Figure 2:
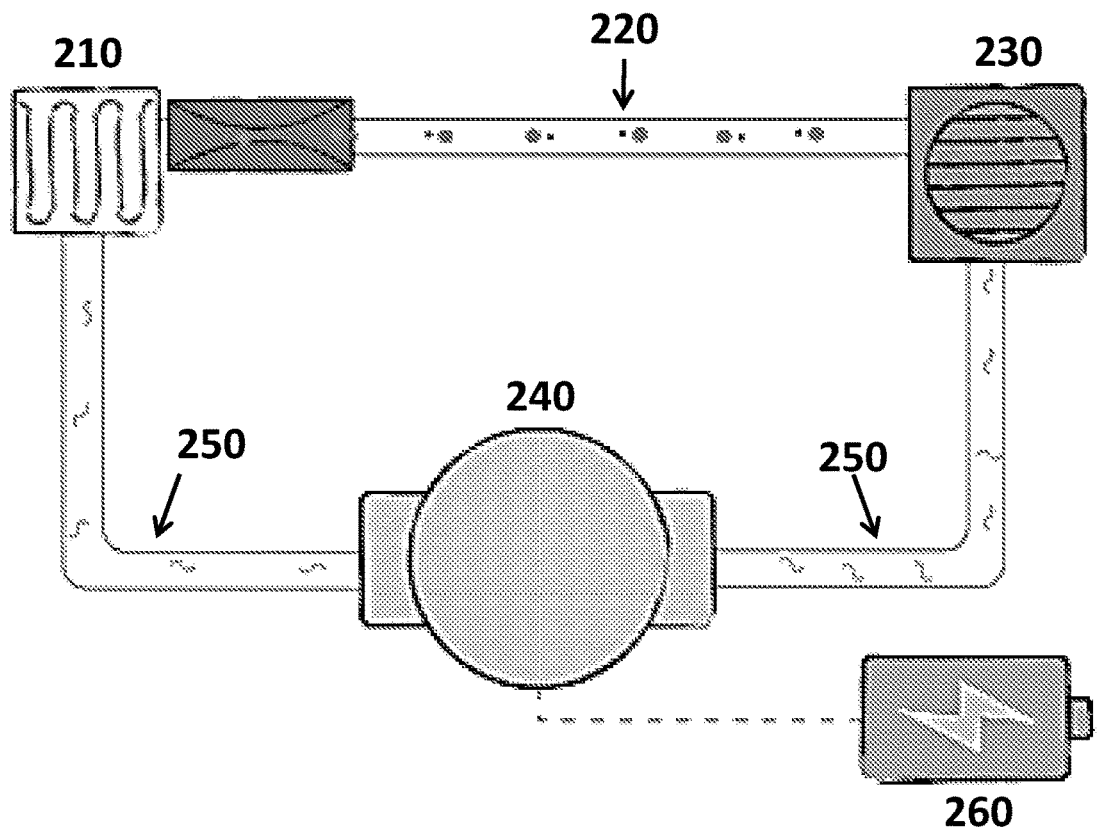
FIG. 2 illustrates an example low pressure, multiphase thermal regulation system.

Low pressure thermal regulation system may use forced evaporation as an alternative to forced condensation. Vacuum (e.g., to achieve a pressure below 1 atm) may be applied to a liquid when the liquid is in contact with or in thermal communication with a source of thermal energy. The transfer of thermal energy from the source to the fluid may cause the liquid to phase transition to a vapor. The transition from liquid to vapor may draw thermal energy from the source of thermal energy and, therefore, cool the source of thermal energy. The FIG. 2 shows an example low pressure multiphase thermal regulation system comprising a closed loop fluid flow path. The example low pressure thermal regulation system comprises a cooling interface 210. The cooling interface 210 may be in contact with or in thermal communication with a source of thermal energy. A liquid coolant 250 may enter the cooling interface 210 and, upon transfer of thermal energy from the source of thermal energy, may undergo a phase change to a vapor coolant 220. The vapor coolant 220 may be directed from the cooling interface 210 to a condenser 230. The condenser may enable the vapor coolant 220 to emit heat and phase transition to the liquid coolant 250, thus regenerating the liquid coolant 250. The system may include a vacuum or flow generator 240 to control and direct the flow of the liquid coolant 250. The vacuum or flow generator 240 may include a power supply 260 that powers the flow generator 240.

Figure 3:
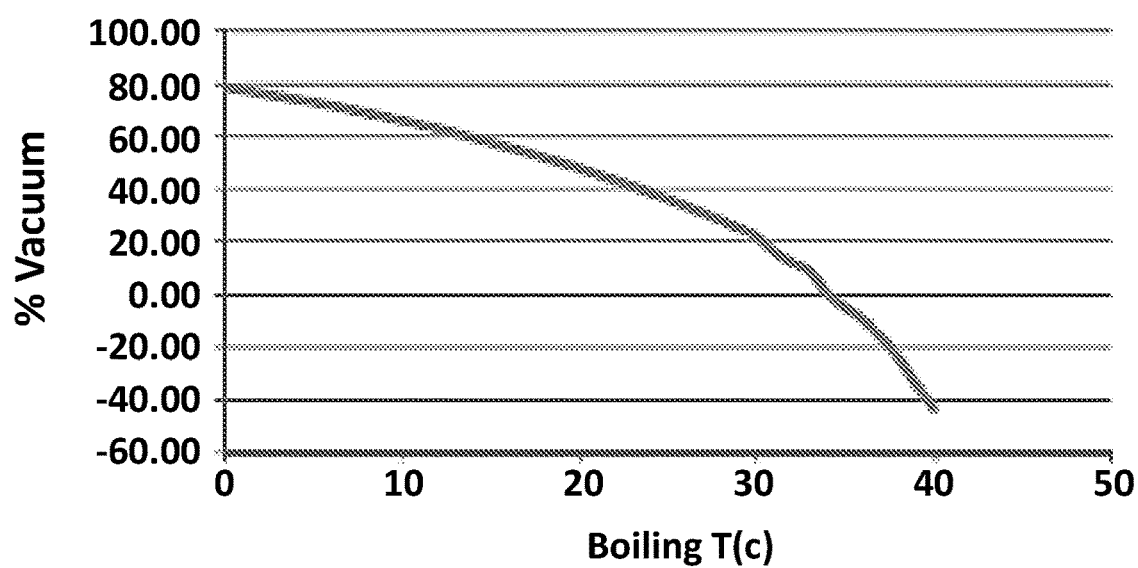
FIG. 3 shows an example plot of the boiling temperature of an example liquid coolant as a function of percent vacuum applied to a system.

The rate of cooling of a low pressure thermal regulation system may be dependent upon the pressure of the system, the flow rate of the coolant, the boiling point of the coolant, the temperature gradient between the coolant and the source of thermal energy, and the thermal conductivity between the source of thermal energy and the coolant. FIG. 3 shows an example plot of the boiling temperature of an example liquid coolant as a function of percent vacuum applied to a system. As the amount of vacuum is increased (e.g., the pressure of the system is reduced) the boiling point of the liquid coolant may decrease. As the amount of vacuum is decreased (e.g., the system becomes pressurized) the boiling point of the liquid coolant may increase. A liquid coolant that is in thermal communication with a heat source may undergo a temperature transition from the ambient temperature of the liquid coolant to the boiling point of the liquid coolant. As thermal energy continues to transfer to the liquid coolant, the liquid coolant may undergo a phase transition to a vapor coolant. The vapor coolant may continue to increase in temperature as thermal energy transfers from the heat source (e.g., source of thermal energy) to the vapor coolant. Thermal energy may be transferred from the source to the coolant during the changes in temperature of the coolant and the phase transition, however, the transfer of thermal energy may be more efficient during the phase transition than during the temperature change of the coolant. Thus, applying a vacuum to multiphase thermal regulation system may lower the boiling point of a liquid coolant and result in more efficient cooling of a source of thermal energy. Low pressure systems for thermal regulation are described in PCT/IL2016/051384, which is entirely incorporated herein by reference.

Systems for Thermal Regulation

In an aspect, the present disclosure provides systems for thermal regulation or thermal management of an energy storage device. The system may comprise a liquid coolant reservoir configured to contain a liquid coolant, a cooling unit in fluid communication with the liquid coolant reservoir and thermal communication with the energy storage device, a fluid flow line in fluid communication with the cooling unit, and a condenser in fluid communication with the fluid flow line and the liquid coolant reservoir. The energy storage device may comprise one or more cells. The one or more cells may be disposed internal to the cooling unit such that the one or more cells are at least partially submerged within the liquid coolant. The cooling unit may be configured to permit transfer of thermal energy from the one or more cells of the energy storage device to the liquid coolant in the cooling unit. The transfer of thermal energy from the energy storage device to the liquid coolant may permit the liquid coolant to undergo a phase transition to a vapor coolant. The fluid flow line may be configured to accept the vapor coolant from the cooling unit. The condenser may be configured to permit the vapor coolant to expel thermal energy and undergo phase transition to the liquid coolant to regenerate the liquid coolant.

The thermal regulation system may be a closed system or an open system. A closed system may be a system that is sealed from an ambient environment such that a fluid within the system does not leave the system. An open system may be a system that is not sealed from an ambient environment such that a fluid within the system may be added or removed from the system. The thermal regulation system may further comprise a closed loop circulatory fluid flow path that comprises the liquid coolant reservoir, cooling unit, fluid flow line, and condenser. The closed loop circulatory fluid flow path may be a closed system. The cells of the energy storage device may be a part of the closed system. For example, the energy storage device may be inserted into the cooling unit and sealed within the cooling unit. The seal may be a hermetic seal. The seal may be a permanent seal (e.g., the energy storage device is not removable from the cooling unit) or the seal may be a temporary seal that permits the energy storage device to be removed and returned to the cooling unit. The cooling unit may have sealed ports that allow for electrical connections between the energy storage device and an external electronic system (e.g., charging station, electric device, electric motor, etc.). The cooling unit may have electrical connections on an internal and an external surface of the cooling unit to allow for electrical connections between the energy storage device and an external electronic system. The electrical connections on the internal surface of cooling unit may allow for an electrical connection between the energy storage device and the cooling unit. The connection may be insulated and/or sealed to protect the electronic components (e.g., electrical cables and connections) from the coolant. The electrical connections on the external surface of the cooling unit may allow for an electrical connection between an electronic system and the cooling unit.

The energy storage device may comprise gaps or spacers between individual cells of the energy storage device. The gaps between the cells may be generated from the shape of the cells. For example, cylindrical cells may have a natural gap between individual cells due to the cross-sectional geometry. Spacers may comprise insulating or conducting materials. During use, the liquid coolant and/or the vapor coolant may flow within the gaps or spacers between the cells. The gaps or spacers may enable a sufficient amount of coolant between the cells to maintain a temperature profile within the cells. Flowing coolant within the gaps or spacers between the cells and directly contacting the cells with the phases changing coolant may increase cooling efficiency and uniformity. The gaps between the cells may be greater than or equal to about 0.5 millimeters (mm), 1 mm, 2 mm, 4 mm, 6 mm, 8 mm, 10 mm, 20 mm, or more. The gaps between the cells may be less than or equal to about 20 mm, 10 mm, 8 mm, 6 mm, 4 mm, 2 mm, 1 mm, 0.5 mm, or less The energy storage device may be positioned in the cooling unit such that at least a portion of the energy storage device is submerged within the liquid coolant. In an example, the energy storage device may be fully submerged within the liquid coolant. The level of the liquid coolant between the cells of the energy storage device may be controlled by the level of liquid coolant in the reservoir. The level of liquid coolant within the reservoir may be controlled by a shut-off valve upstream of the reservoir. The shut-off valve may be a mechanical, electronic, or pneumatic valve. The shut-off valve may close if the level of liquid coolant within the reservoir reaches a maximum level and may open if the level of liquid coolant within the reservoir goes below a minimum level. In an example, the maximum level and minimum level are substantially the same level. The maximum level in the liquid coolant reservoir may be less than or equal to about 95%, 90%, 80%, 70%, 60%, 50%, 40%, 30%, 20%, 10%, or less of the total reservoir level. The maximum level in the liquid coolant reservoir may be greater than or equal to about 10%, 20%, 30%, 40%, 50%, 60%, 70%, 80%, 90%, 95%, or more of the total reservoir level. The level of liquid coolant in the reservoir may be controlled to be between about 10% and 20%, 10% and 30%, 10% and 40%, 10% and 50%, 10% and 60%, 10% and 70%, 10% and 80%, 10% and 90%, or 10% and 95% of the total reservoir level. The liquid coolant may evaporate to form a vapor coolant. The liquid coolant, vapor coolant, or both the liquid coolant and vapor coolant may contact the energy storage device at any given time during operation. The cooling unit may further comprise flow barriers in the gaps between cells. The flow barriers may be the spacers. The flow barriers may control the coolant level in the cooling unit and maintain a uniform coolant level in the gaps or spaces between the cells. The flow barriers may prevent liquid coolant from entering the fluid flow line if the system is tilted or jostled.

The cooling unit may be sized to accommodate or houses one or more energy storage devices. The cooling unit may be sized to accommodate or house greater than or equal to 1, 2, 3, 4, 5, 6, 8, 10, 15, 20, 30, 40, 50, or more energy storage devices. The cooling unit may have any three-dimensional (3-D) shape. For example, the cooling unit may be cubic, rectangular, or cylindrical. The cooling unit may have a vertical dimension (e.g., a dimension parallel to a vector of gravitational acceleration) and one or more horizontal dimensions (e.g., dimensions orthogonal to a vector of gravitational acceleration). The cooling unit may have a vertical dimension that is greater than or equal to about 1 cm, 2 cm, 4 cm, 6 cm, 8 cm, 10 cm, 15 cm, 20 cm, 25 cm, 30 cm, 40 cm, 50 cm, or greater. The cooling unit may have one or more horizontal dimensions that are greater than or equal to about 1 cm, 2 cm, 4 cm, 6 cm, 8 cm, 10 cm, 15 cm, 20 cm, 25 cm, 30 cm, 40 cm, 50 cm, or greater. The cooling unit may be formed of an insulating or a thermally conductive material. For example, the cooling unit may be formed out of a polymer (e.g., plastic), composite material, metal, or any combination thereof.

Figure 4A:
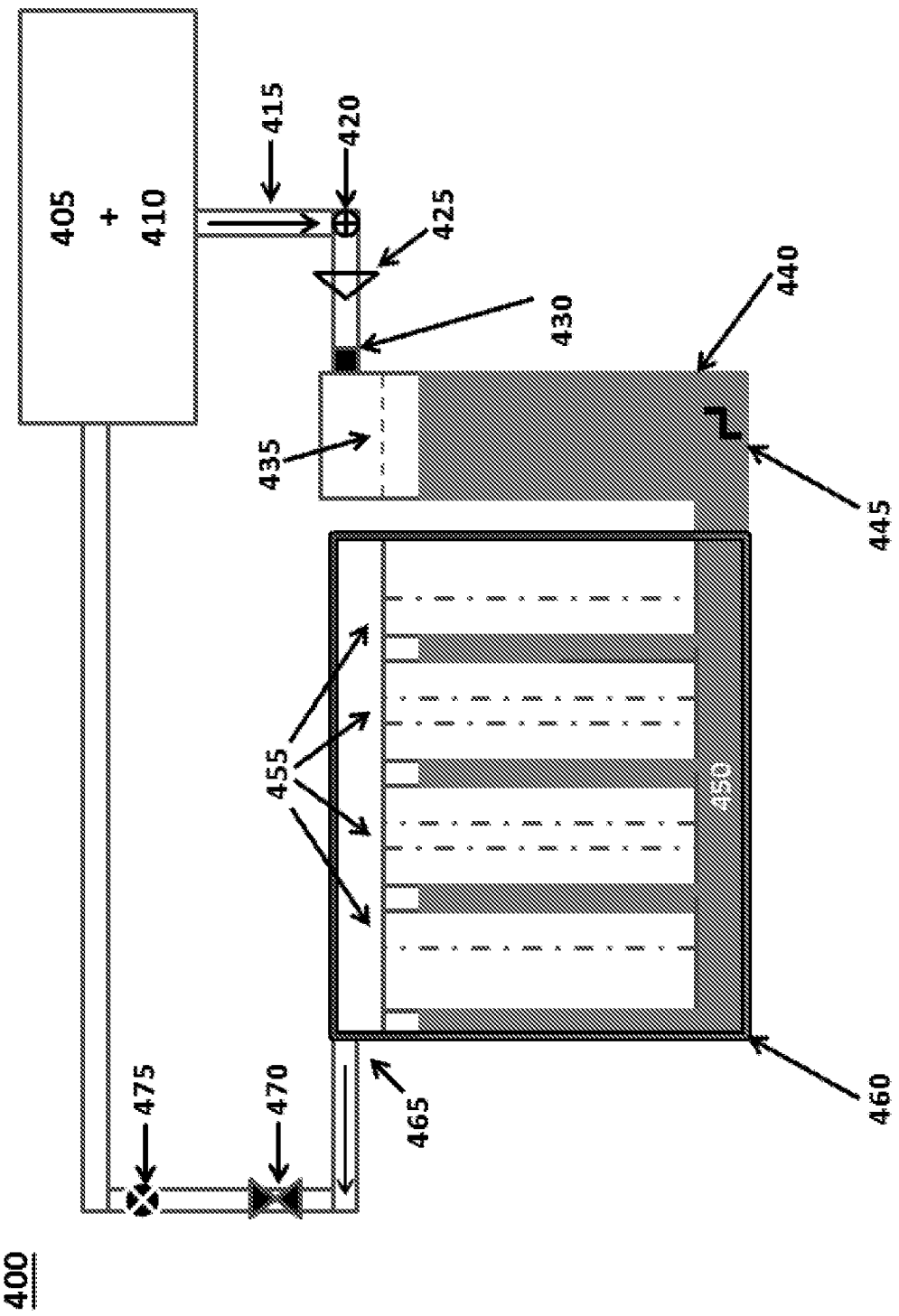
FIGS. 4A and 4B illustrate example thermal regulation systems comprising a cooling unit.
Figure 4B:
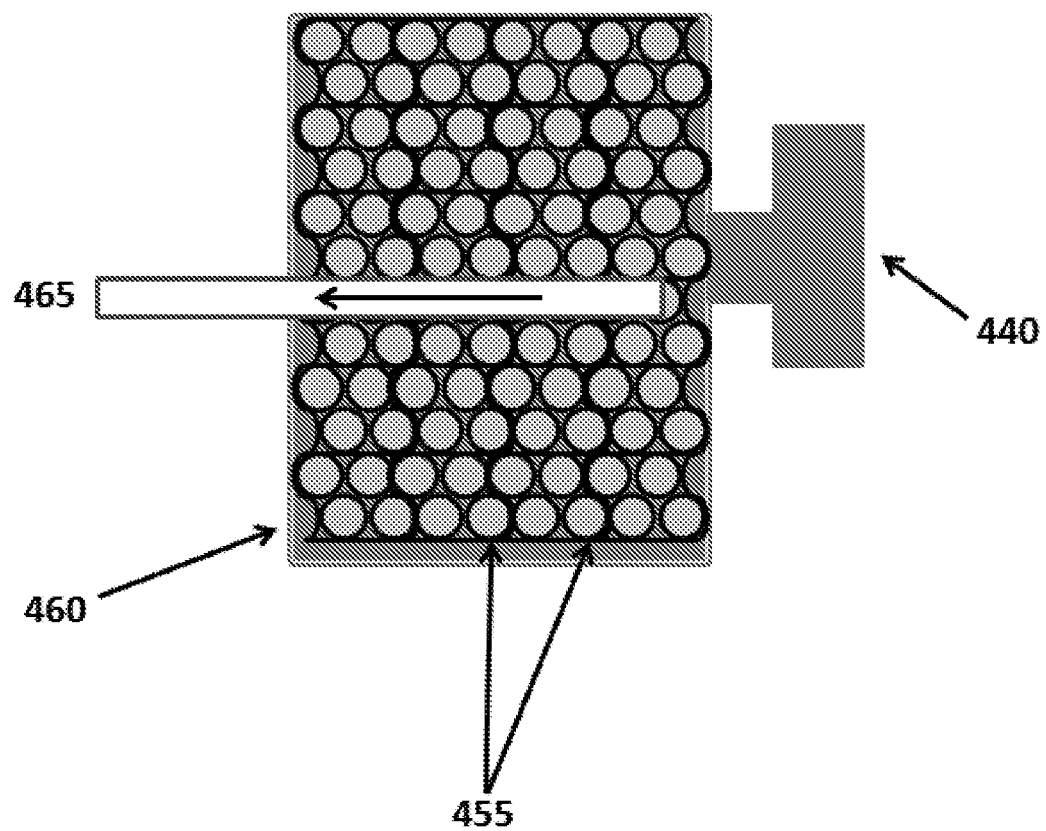

FIGS. 4A and 4B illustrate example thermal regulation systems comprising a cooling unit. FIG. 4A shows a thermal regulation system 400 with cells 455 of an energy storage device (e.g., battery cells) submerged in a liquid coolant 450 within a cooling unit 460. The cells of the energy storage device 455 may provide thermal energy (e.g., heat) to the liquid coolant 450. At least a portion of the liquid coolant 450 may undergo a phase transition to a vapor coolant in the cooling unit 460. The vapor coolant may leave the cooling unit 460 through a vapor coolant outlet to a fluid flow line 465. The fluid flow line 465 may direct the fluid from the cooling unit 460 to the condenser 405. The condenser 405 may include a fan 410. The condenser 405 may condense the vapor coolant to a liquid coolant 450 to regenerate the liquid coolant 450. The liquid coolant 450 may be directed from the condenser 405 to a liquid coolant reservoir 440 via a liquid coolant inlet 415. The liquid coolant reservoir 440 may have a maximum liquid coolant level 435. The maximum liquid coolant level 435 may be controlled by a shut-off valve 430. Additionally, the system may comprise a heater 445, a flow restrictor 425, a flow pump 420, a vacuum generator 475, a back pressure regulator 470, or any combination thereof. FIG. 4B shows a top-down view of cylindrical cells 455 of an energy storage device (e.g., battery cells) submerged in a liquid coolant 450 within a cooling unit 460. The cells 455 may have gaps between them such that the coolant may flow between the cells. The cooling unit 460 may be in fluid communication with the liquid coolant reservoir 440 such that a level of liquid coolant 450 is maintained within the cooling unit 460. A top portion of the cooling unit may be in fluid communication with a fluid flow line 465 such that a vapor coolant generated from the liquid coolant 450 is directed away from the cooling unit 460 by the fluid flow line 460.

In another aspect, the present disclosure provides systems for thermal regulation or thermal management of an energy storage device. The system may comprise a liquid coolant reservoir configured to contain a liquid coolant, a plurality of microchannel evaporators in fluid communication with the liquid coolant reservoir and thermal communication with the energy storage device, a fluid flow line in fluid communication with the plurality of microchannel evaporators, and a condenser in fluid communication with the fluid flow line and the liquid coolant reservoir. The energy storage device may comprise one or more cells. The plurality of microchannel evaporators may be configured to permit transfer of thermal energy from the one or more cells of the energy storage device to the liquid coolant in the plurality of microchannel evaporators. The transfer of thermal energy from the energy storage device to the liquid coolant may permit the liquid coolant to undergo a phase transition to a vapor coolant. The fluid flow line may be configured to accept the vapor coolant from the plurality of microchannel evaporators. The condenser may be configured to permit the vapor coolant to expel thermal energy and undergo phase transition to the liquid coolant to regenerate the liquid coolant.

The thermal regulation system may be a closed system or an open system. A closed system may be a system that is sealed from an ambient environment such that a fluid within the system does not leave the system. An open system may be a system that is not sealed from an ambient environment such that a fluid within the system may be added or removed from the system. The thermal regulation system may further comprise a closed loop circulatory fluid flow path that comprises the liquid coolant reservoir, plurality of microchannel evaporators, fluid flow line, and condenser. The closed loop circulatory fluid flow path may be a closed system. The cells of the energy storage device may be a part of the closed system or may not be a part of the closed loop system. For example, the energy storage device may be directly in contact with or indirectly in contact with one or more of the microchannel evaporators and, thus, not be a part of the closed loop system.

The system may comprise one or more microchannel evaporators. In an example, the system comprises a plurality of microchannel evaporators. The microchannel evaporators may have any 3-D shape. For example, the microchannel evaporators may be cylindrical, prismatic, rectangular, or have a complex shape (e.g., curved, curled, or nonplanar). The microchannel evaporators may comprise a chamber or channel through which coolant may flow. Liquid coolant may flow into a bottom side of the chamber or channel and vapor coolant may flow out of a top side of the chamber or channel. The direction of fluid flow within the microchannel evaporator may be parallel or substantially parallel to a vector of gravitational acceleration. The chamber or channel may have a width (e.g., dimension orthogonal to fluid flow) that is greater than or equal to about 10 micrometers ($\mu$m), 15 $\mu$m, 20 $\mu$m, 25 $\mu$m, 30 $\mu$m, 40 $\mu$m, 50 $\mu$m, 100 $\mu$m, 150 $\mu$m, 200 $\mu$m, 250 $\mu$m, 300 $\mu$m, 400 $\mu$m, 0.5 millimeters (mm), 1 mm, 2 mm, 4 mm, 6 mm, 8 mm, 10 mm, or more. The chamber or channel may have a width that is less than or equal to about 10 mm, 8 mm, 6 mm, 2 mm, 1 mm, 0.5 mm, 400 $\mu$m, 300 $\mu$m, 250 $\mu$m, 200 $\mu$m, 150 $\mu$m, 100 $\mu$m, 50 $\mu$m, 40 $\mu$m, 30 $\mu$m, 25 $\mu$m, 20 $\mu$m, 15 $\mu$m, 10 $\mu$m, or less. The channel or chamber may have a volume of less than or equal to about 4,000 cubic centimeters ($cm^3$), 3,500 $cm^3$, 3,000 $cm^3$, 2,500 $cm^3$, 2,000 $cm^3$, 1,500 $cm^3$, 1,000 $cm^3$, 750 $cm^3$, 500 $cm^3$, 250 $cm^3$, 200 $cm^3$, 150 $cm^3$, 100 $cm^3$, 75 $cm^3$, 50 $cm^3$, 25 $cm^3$, 20 $cm^3$, 15 $cm^3$, 10 $cm^3$, 8 $cm^3$, 6 $cm^3$, 4 $cm^3$, 2 $cm^3$, 1 $cm^3$, 0.5 $cm^3$, or less. The channel or chamber may have a volume of greater than or equal to about 0.5 $cm^3$, 1 $cm^3$, 2 $cm^3$, 4 $cm^3$, 6 $cm^3$, 8 $cm^3$, 10 $cm^3$, 15 $cm^3$, 20 $cm^3$, 25 $cm^3$, 50 $cm^3$, 75 $cm^3$, 100 $cm^3$, 150 $cm^3$, 200 $cm^3$, 250 $cm^3$, 500 $cm^3$, 750 $cm^3$, 1,000 $cm^3$, 1,500 $cm^3$, 2,000 $cm^3$, 2,500 $cm^3$, 3,000 $cm^3$, 3,500 $cm^3$, 4,000 $cm^3$, or more. The microchannel evaporator may have a heat transfer area of greater than or equal to about 0.5 squared centimeters ($cm^2$), 1 $cm^2$, 2 $cm^2$, 4 $cm^2$, 6 $cm^2$, 8 $cm^2$, 10 $cm^2$, 15 $cm^2$, 20 $cm^2$, 30 $cm^2$, 40 $cm^2$, 50 $cm^2$, 75 $cm^2$, 100 $cm^2$, 150 $cm^2$, 200 $cm^2$, 300 $cm^2$, 350 $cm^2$, 400 $cm^2$, or more. The microchannel evaporator may have a heat transfer area of less than or equal to 400 $cm^2$, 350 $cm^2$, 300 $cm^2$, 250 $cm^2$, 200 $cm^2$, 150 $cm^2$, 100 $cm^2$, 75 $cm^2$, 50 $cm^2$, 40 $cm^2$, 30 $cm^2$, 20 $cm^2$, 15 $cm^2$, 10 $cm^2$, 8 $cm^2$, 6 $cm^2$, 4 $cm^2$, 2 $cm^2$, 1 $cm^2$, 0.5 $cm^2$, or less.

The microchannel evaporators may be in direct contact with the cells of the energy storage device or may be in indirect contact with the cells of the energy storage device. The microchannel evaporators may be disposed or placed between cells of the energy storage device. The microchannel evaporators may be position such that each cell of the energy storage device is in thermal communication with at least one microchannel evaporator. The system may comprise greater than or equal to about 1, 2, 3, 4, 5, 6, 7, 8, 9, 10, 15, 20, 25, 30, 40, 50, or more microchannel evaporators. The microchannel evaporators may comprise materials with high thermal conductivity, high corrosion resistance, or both high thermal conductivity and high corrosion resistance. The microchannel evaporators may comprise a material with high thermal conductivity, such as, for example, metals (e.g., copper, aluminum, iron, steel, etc.), non-metal conductors (e.g., graphite or silicon), heat transfer fluids, or any combination thereof.

The level of the liquid coolant in the microchannel evaporators may be controlled by the level of liquid coolant in the reservoir. The level of liquid coolant within the reservoir may be controlled by a shut-off valve upstream of the reservoir. The shut-off valve may be a mechanical, electronic, or pneumatic valve. The shut-off valve may close if the level of liquid coolant within the reservoir reaches a maximum level and may open if the level of liquid coolant within the reservoir goes below a minimum level. In an example, the maximum level and minimum level are substantially the same level. The maximum level in the liquid coolant reservoir may be less than or equal to about 95%, 90%, 80%, 70%, 60%, 50%, 40%, 30%, 20%, 10%, or less of the total reservoir level. The maximum level in the liquid coolant reservoir may be greater than or equal to about 10%, 20%, 30%, 40%, 50%, 60%, 70%, 80%, 90%, 95%, or more of the total reservoir level. The level of liquid coolant in the reservoir may be controlled to between about 10% and 20%, 10% and 30%, 10% and 40%, 10% and 50%, 10% and 60%, 10% and 70%, 10% and 80%, 10% and 90%, or 10% and 95% of the total reservoir level. The liquid coolant may evaporate to form a vapor coolant. The liquid coolant, vapor coolant, or both the liquid coolant and vapor coolant may be present in the microchannel evaporators at any given time during operation of the system. The microchannel evaporators may further comprise flow barriers to control the coolant level in the microchannel evaporators and maintain a uniform coolant level in microchannel evaporators. The flow barriers may prevent liquid coolant from entering the fluid flow line if the system is tilted or jostled.

The liquid coolant may undergo phase transition to a vapor coolant within the microchannel evaporators. The formation of a vapor coolant may generate bubbles within the microchannel evaporators. As the bubble rise the length of the microchannel evaporators, the bubbles may push liquid coolant up. The liquid coolant that is pushed up may increase the efficiency of thermal energy transfer. Alternatively, or in addition to, the microchannel evaporators may be replaced with any other device that forces the liquid to flow up wards (e.g., parallel and opposite to a vector of gravitational acceleration).

Figure 5A:
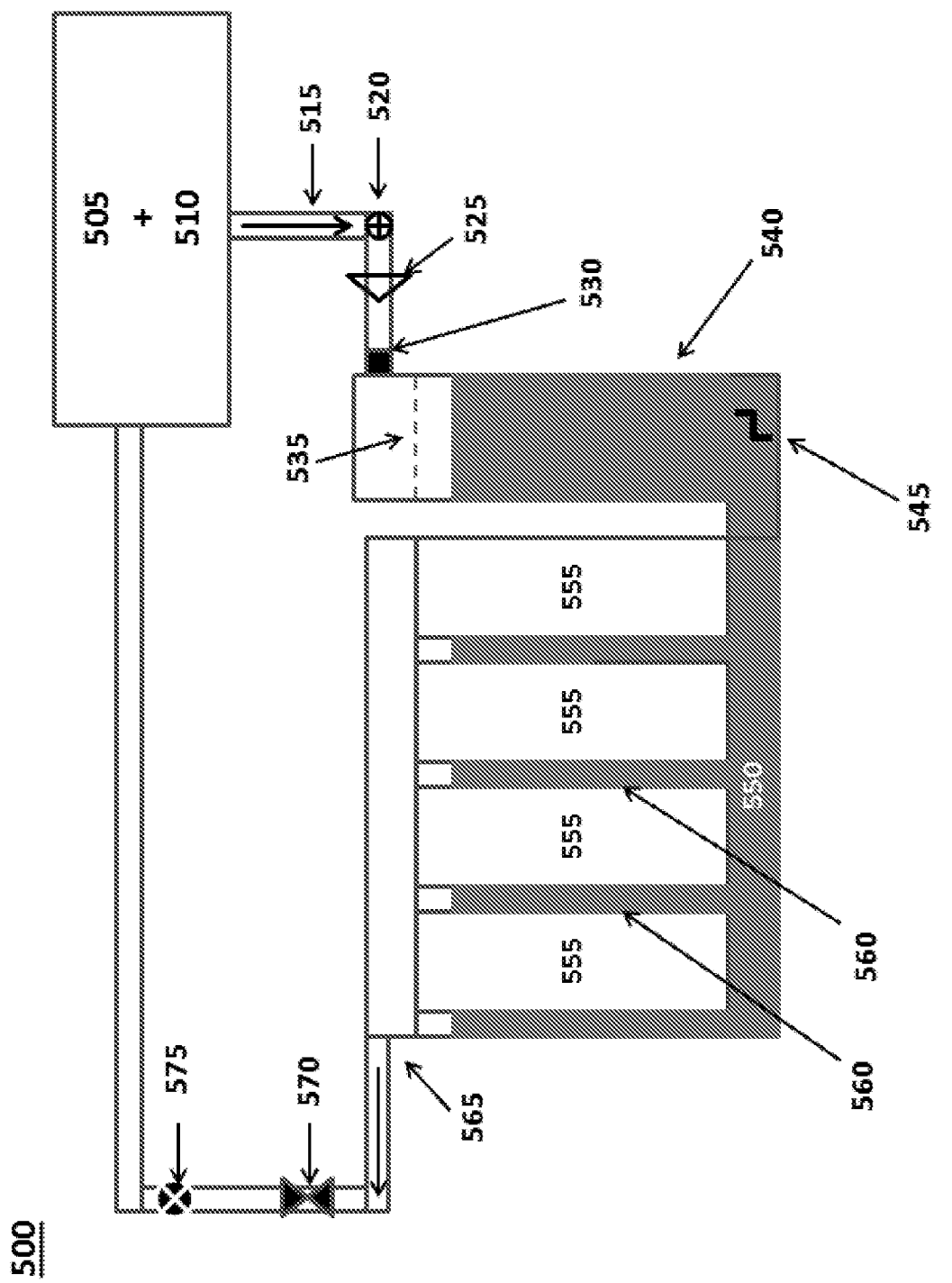
FIGS. 5A-5C illustrate example thermal regulation systems comprising microchannel evaporators.
Figure 5B:
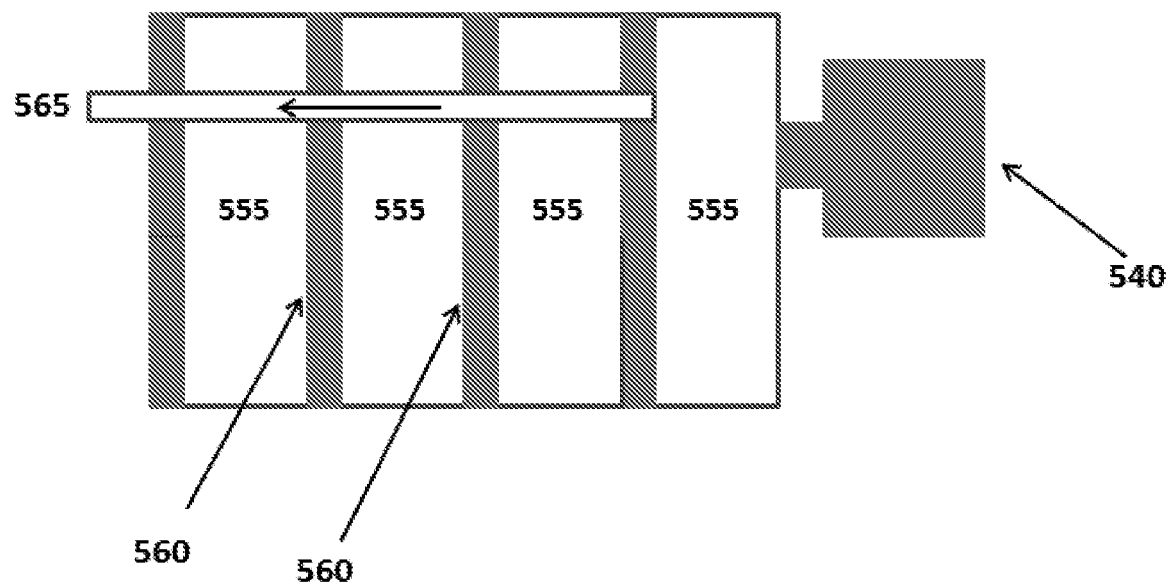
Figure 5C:
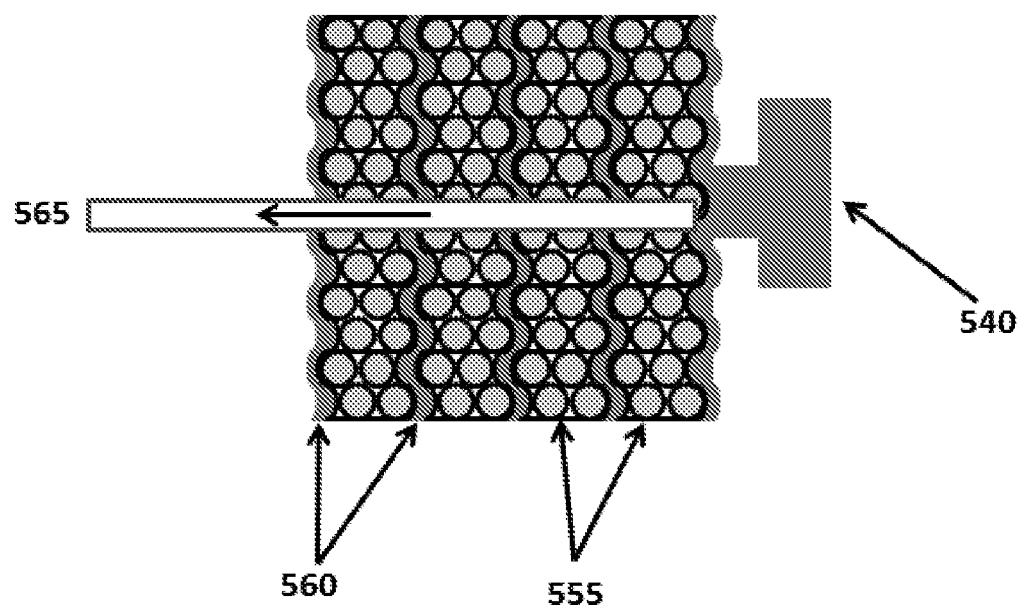

FIGS. 5A-5C illustrate example thermal regulation systems comprising microchannel evaporators. FIG. 5A shows a thermal regulation system 500 with cells 555 of an energy storage device (e.g., battery cells) disposed adjacent to microchannel evaporators 560. The microchannel evaporators 560 may contain a liquid coolant 550. The cells of the energy storage device 555 may provide thermal energy (e.g., heat) to the liquid coolant 550. At least a portion of the liquid coolant 550 may undergo a phase transition to a vapor coolant in the microchannel evaporators 560. The vapor coolant may leave the microchannel evaporators 560 through a vapor coolant outlet to a fluid flow line 565. The fluid flow line 565 may direct the fluid from the microchannel evaporators 560 to the condenser 505. The condenser 505 may include a fan 510. The condenser 505 may condense the vapor coolant to a liquid coolant 550 to regenerate the liquid coolant 550. The liquid coolant 550 may be directed from the condenser 505 to a liquid coolant reservoir 540 via a liquid coolant inlet 515. The liquid coolant reservoir 540 may have a maximum liquid coolant level 535. The maximum liquid coolant level 535 may be controlled by a shut-off valve 530. Additionally, the system may comprise a heater 545, a flow restrictor 525, a flow pump 520, a vacuum generator 575, a back pressure regulator 570, or any combination thereof.

FIGS. 5B and 5C show top-down views of the thermal regulation system. FIG. 5B shows a top-down view of rectangular cells 555 of an energy storage device (e.g., battery cells) in contact with rectangular microchannel evaporators 560. FIG. 5C shows a top-down view of cylindrical cells 555 in contact with curved microchannel evaporators 560. The cells 555 may have gaps between them such that the microchannel evaporator 560 may be positioned between the cells 555. The microchannel evaporators 560 may be in fluid communication with the liquid coolant reservoir 540 such that a level of liquid coolant 550 is maintained within the microchannel evaporators 560. A top portion of the microchannel evaporators 560 may be in fluid communication with a fluid flow line 565 such that a vapor coolant generated from the liquid coolant 550 is directed away from the cooling unit 560 by the fluid flow line 560.

In another aspect, the present disclosure provides systems for thermal regulation or thermal management of an energy storage device. The system may comprise an evaporator configured to contain a liquid coolant and a vapor coolant, a fluid flow line in fluid communication with the evaporator, and a condenser in fluid communication with the fluid flow line and the evaporator. The energy storage device may comprise one or more cells. The evaporator may comprise a surface that is in thermal communication with the one or more cells. The evaporator may be configured to permit transfer of thermal energy from the one or more cells of the energy storage device to the liquid coolant such that at least a portion of the liquid coolant in the evaporator undergoes a phases transition to yield a vapor coolant in a space adjacent to the liquid coolant and disposed away from the surface. The fluid flow line may be configured to accept the vapor coolant from the evaporator. The condenser may be configured to permit the vapor coolant to expel thermal energy and undergo phase transition to the liquid coolant to regenerate the liquid coolant.

The thermal regulation system may be a closed system or an open system. A closed system may be a system that is sealed from an ambient environment such that a fluid within the system does not leave the system. An open system may be a system that is not sealed from an ambient environment such that a fluid within the system may be added or removed from the system. The thermal regulation system may further comprise a closed loop circulatory fluid flow path that comprises the evaporator, fluid flow line, and condenser. The closed loop circulatory fluid flow path may be a closed system. The cells of the energy storage device may be a part of the closed system or may not be a part of the closed loop system. For example, the energy storage device may be directly in contact with or indirectly in contact with the evaporator and, thus, not be a part of the closed loop system.

The system may comprise one or more evaporators. The evaporator may have any 3-D shape. For example, the evaporators may be cylindrical, prismatic, rectangular, or have a complex shape (e.g., curved, curled, or nonplanar). The evaporator may comprise a chamber through which coolant may flow. Liquid coolant may flow into a one side of the chamber and vapor coolant may flow out of another side of the chamber. The vapor coolant outlet may be positions such that it is above a level of the liquid coolant to prevent liquid coolant from entering the fluid flow line. The direction of fluid flow within evaporator may be orthogonal or not parallel to a vector of gravitational acceleration. The chamber may have a height (e.g., dimension parallel to fluid flow) that is greater than or equal to about 0.5 millimeters (mm), 1 mm, 2 mm, 4 mm, 6 mm, 8 mm, 10 mm, 20 mm, 40 mm, 60 mm, 80 mm, 1 centimeter (cm), 2 cm, 3 cm, 4 cm, 5 cm, 6 cm, 8 cm, 10 cm, 15 cm, 20 cm, 25 cm, 30 cm, 40 cm, 50 cm, or more. The chamber or channel may have a width that is less than or equal to about 50 cm, 40 cm, 30 cm, 25 cm, 20 cm, 10 m, 8 cm, 6 cm, 5 cm, 4 cm, 3 cm, 2 cm, 1 cm, 80 mm, 60 mm, 40 mm, 20 mm, 10 mm, 8 mm, 6 mm, 2 mm, 1 mm, 0.5 mm, or less. The channel may have a volume of less than or equal to about 4,000 cubic centimeters ($cm^3$), 3,500 $cm^3$, 3,000 $cm^3$, 2,500 $cm^3$, 2,000 $cm^3$, 1,500 $cm^3$, 1,000 $cm^3$, 750 $cm^3$, 500 $cm^3$, 250 $cm^3$, 200 $cm^3$, 150 $cm^3$, 100 $cm^3$, 75 $cm^3$, 50 $cm^3$, 25 $cm^3$, 20 $cm^3$, 15 $cm^3$, 10 $cm^3$, 8 $cm^3$, 6 $cm^3$, 4 $cm^3$, 2 $cm^3$, 1 $cm^3$, 0.5 $cm^3$, or less. The chamber may have a volume of greater than or equal to about 0.5 $cm^3$, 1 $cm^3$, 2 $cm^3$, 4 $cm^3$, 6 $cm^3$, 8 $cm^3$, 10 $cm^3$, 15 $cm^3$, 20 $cm^3$, 25 $cm^3$, 50 $cm^3$, 75 $cm^3$, 100 $cm^3$, 150 $cm^3$, 200 $cm^3$, 250 $cm^3$, 500 $cm^3$, 750 $cm^3$, 1,000 $cm^3$, 1,500 $cm^3$, 2,000 $cm^3$, 2,500 $cm^3$, 3,000 $cm^3$, 3,500 $cm^3$, 4,000 $cm^3$, or more. The evaporator may have a heat transfer area of greater than or equal to about 0.5 squared centimeters ($cm^2$), 1 $cm^2$, 2 $cm^2$, 4 $cm^2$, 6 $cm^2$, 8 $cm^2$, 10 $cm^2$, 15 $cm^2$, 20 $cm^2$, 30 $cm^2$, 40 $cm^2$, 50 $cm^2$, 75 $cm^2$, 100 $cm^2$, 150 $cm^2$, 200 $cm^2$, 300 $cm^2$, 350 $cm^2$, 400 $cm^2$, or more. The evaporator may have a heat transfer area of less than or equal to 400 $cm^2$, 350 $cm^2$, 300 $cm^2$, 250 $cm^2$, 200 $cm^2$, 150 $cm^2$, 100 $cm^2$, 75 $cm^2$, 50 $cm^2$, 40 $cm^2$, 30 $cm^2$, 20 $cm^2$, 15 $cm^2$, 10 $cm^2$, 8 $cm^2$, 6 $cm^2$, 4 $cm^2$, 2 $cm^2$, 1 $cm^2$, 0.5 $cm^2$, or less. The heat transfer area may be orthogonal or may not be parallel to a direction the vector of gravitational acceleration.

The energy storage device may be in contact with an external surface of the evaporator or the energy storage device may be internal to the evaporator. In an example, the energy storage device is internal to the evaporator and fully submerged by the liquid coolant. The evaporator may be in direct contact with the cells of the energy storage device or may be in indirect contact with the cells of the energy storage device. The cells of the energy storage device may be disposed such that the evaporator is adjacent to a long dimension of the cells (e.g., the cells are positioned horizontally). Alternatively, or in addition to, the cells of the energy storage device may be disposed such that the evaporator is adjacent to a short dimension of the cells (e.g., the cells are positioned vertically). The evaporator may be position such that each cell of the energy storage device is in contact with the evaporator or such that a single cell is in contact with the evaporator. The evaporator may comprise materials with high thermal conductivity, high corrosion resistance, or both high thermal conductivity and high corrosion resistance. The evaporator may comprise a material with high thermal conductivity, such as, for example, metals (e.g., copper, aluminum, iron, steel, etc.), non-metal conductors (e.g., graphite or silicon), heat transfer fluids, or any combination thereof.

The level of the liquid coolant in the evaporator may be controlled by a shut-off valve upstream of the evaporator.

The shut-off valve may be a mechanical, electronic, or pneumatic valve. The shut-off valve may close if the level of liquid coolant within the evaporator reaches a maximum level and may open if the level of liquid coolant within the evaporator goes below a minimum level. In an example, the maximum level and minimum level are substantially the same level. The maximum level in the evaporator may be less than or equal to about 95%, 90%, 80%, 70%, 60%, 50%, 40%, 30%, 20%, 10%, or less of the total evaporator height. The maximum level in the evaporator may be greater than or equal to about 10%, 20%, 30%, 40%, 50%, 60%, 70%, 80%, 90%, 95%, or more of the total evaporator height. The level of liquid coolant in the evaporator may be controlled to be between about 10% and 20%, 10% and 30%, 10% and 40%, 10% and 50%, 10% and 60%, 10% and 70%, 10% and 80%, 10% and 90%, or 10% and 95% of the total evaporator height. The liquid coolant may evaporate to form a vapor coolant. The liquid coolant, vapor coolant, or both the liquid coolant and vapor coolant may be present in the evaporator at any given time during operation of the system. The evaporator may further comprise a flow barrier to prevent liquid coolant from entering the fluid flow line if the system is tilted or jostled.

Figure 6A:
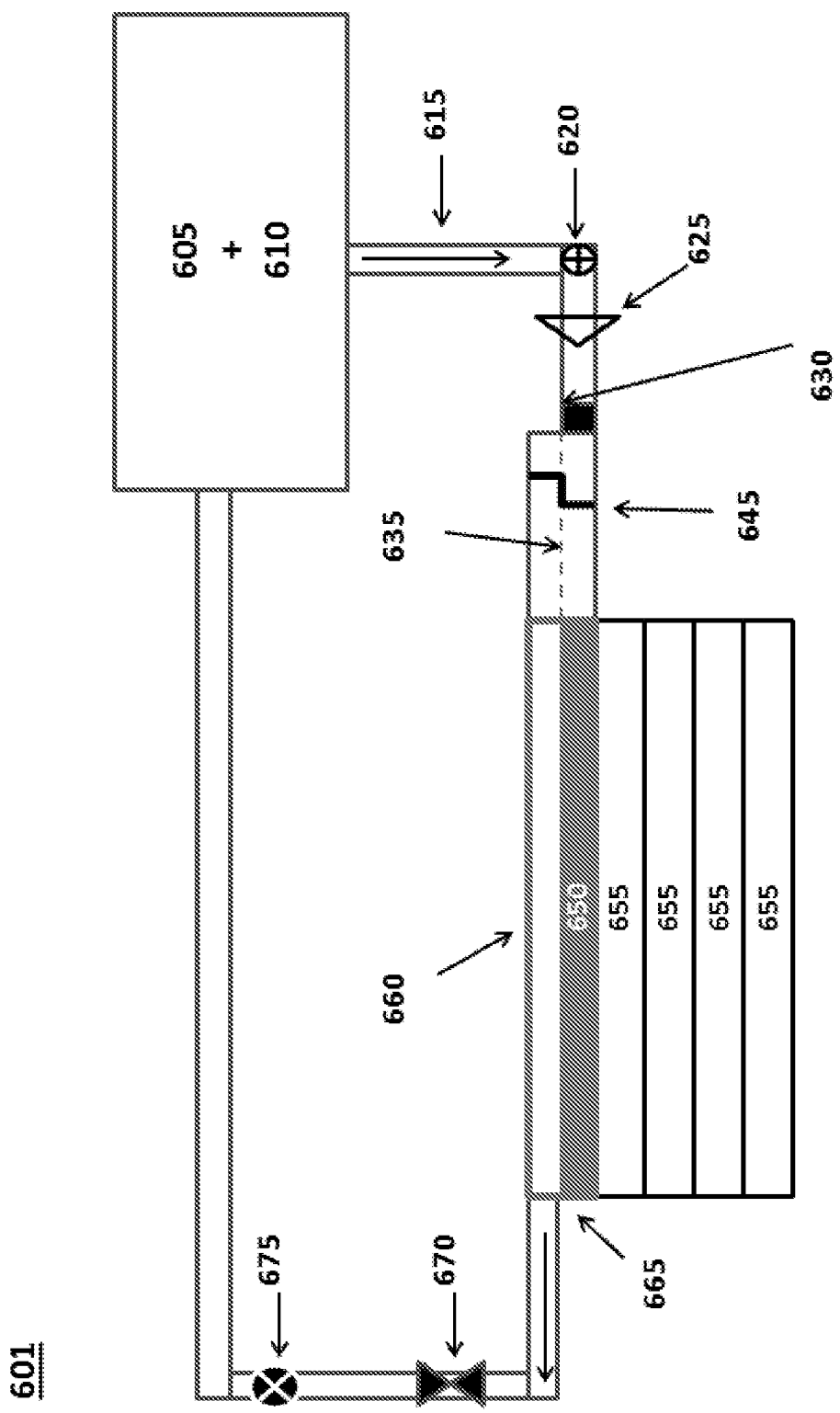
FIGS. 6A and 6B illustrate example thermal regulation systems comprising an evaporator.
Figure 6B:
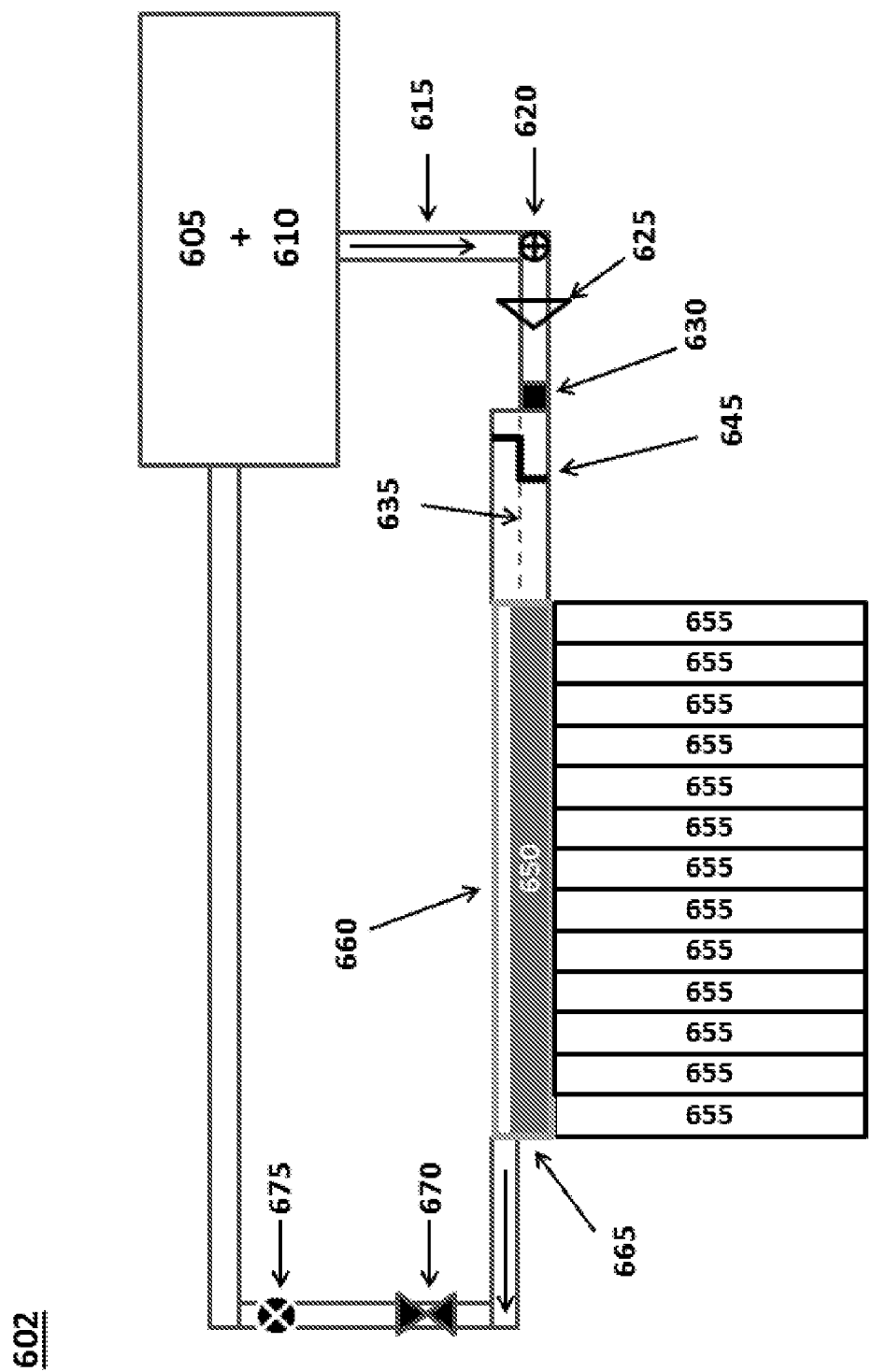

FIGS. 6A and 6C illustrate example thermal regulation systems comprising an evaporator. FIG. 6A shows a thermal regulation system 600 with cells 655 of an energy storage device (e.g., battery cells) disposed such that a long dimension of the cells 655 is adjacent to the evaporator 660. FIG. 6B shows a thermal regulation system 600 with cells 655 of an energy storage device (e.g., battery cells) disposed such that a short dimension of the cells 655 is adjacent to the evaporator 660. The evaporator 660 may contain a liquid coolant 650. The cells of the energy storage device 655 may provide thermal energy (e.g., heat) to the liquid coolant 650. At least a portion of the liquid coolant 650 may undergo a phase transition to a vapor coolant in the evaporator 660. The vapor coolant may leave the evaporator 660 through a vapor coolant outlet to a fluid flow line 665. The fluid flow line 665 may direct the fluid from a space in the evaporator 660 above the liquid coolant 650 to the condenser 605. The condenser 605 may include a fan 610. The condenser 605 may condense the vapor coolant to a liquid coolant 650 to regenerate the liquid coolant 650. The liquid coolant 650 may be directed from the condenser 605 to the evaporator 660 via a liquid coolant inlet 615. The evaporator 660 may have a maximum liquid coolant level 635. The maximum liquid coolant level 635 may be controlled by a shut-off valve 630. Additionally, the system may comprise a heater 645, a flow restrictor 625, a flow pump 620, a vacuum generator 675, a back pressure regulator 670, or any combination thereof.

In another aspect, the present disclosure provides systems for thermal regulation or thermal management of a cable or other elongated structure (e.g., tube, plate, pipe, conduit, etc.). The system may comprise an isolating unit comprising a liquid coolant inlet and a vapor coolant outlet, a fluid flow line in fluid communication with the isolating unit, and a condenser in fluid communication with the fluid flow line and the isolating unit. The isolating unit may be disposed along a long dimension of the cable. The isolating unit may be in thermal communication with the cable. The isolating unit may be configured to permit transfer of thermal energy from the cable to a liquid coolant such that at least a portion of the liquid coolant undergoes a phase transition to a vapor coolant. The fluid flow line may be configured to accept the vapor coolant from the isolating unit. The condenser may be configured to permit the vapor coolant to expel thermal energy and undergo phase transition to the liquid coolant to regenerate the liquid coolant.

The thermal regulation system may be a closed system or an open system. A closed system may be a system that is sealed from an ambient environment such that a fluid within the system does not leave the system. An open system may be a system that is not sealed from an ambient environment such that a fluid within the system may be added or removed from the system. The thermal regulation system may further comprise a closed loop circulatory fluid flow path that comprises the isolating unit, fluid flow line, and condenser. The closed loop circulatory fluid flow path may be a closed system. The cable may be a part of the closed system or may not be a part of the closed loop system. For example, the cable may be directly in contact with or indirectly in contact with the isolating unit and, thus, not be a part of the closed loop system. Alternatively, or in addition to, the cable may be internal to the isolating system and submerged or surrounded by the liquid coolant and, therefore, may be a part of the closed loop system.

The system may comprise one or more isolating units. The isolating unit may have any 3-D shape. For example, the isolating unit may be a tube, hose, pipe, conduit, or any other shape. The isolating unit may have a cross-sectional shape that is circular, rectangular, square, polygonal, or any other shape. The isolating unit may comprise one or more separate compartments. For example, the isolating unit may have a compartment that comprises predominantly liquid coolant and a second compartment that comprises predominantly vapor coolant. The isolating unit may have a single compartment that comprises both liquid and vapor coolant. The isolating unit may be structured to have an internal component and an external component. The internal component may be a tube, hose, pipe, conduit or other structure that is disposed internal to another tube, hose, pipe, conduit or other structure. The internal component may be configured to flow the liquid coolant, vapor coolant, or both the liquid coolant and the vapor coolant. The external component may surround the internal component and may be configured to flow the liquid coolant, vapor coolant, or both the liquid coolant and the vapor coolant.

The isolating unit may be in thermal communication with a cable. The cable may be any cable, such as an electronic cable, communication cable, or any other cable that for use with a thermal management or regulation system. In an example, the cable is a charging cable for an electronic device. The electronic device may be an electric vehicle and the cable may be a high voltage or high amperage cable. The thermal regulation or thermal management system alternatively, or in addition to cables, may be used to thermally regulate tubes, lines, pipes, conduits, or other features. The isolating unit may be configured to encapsulate or enclose the cable. For example, the isolating unit may be a tube and the cable may be threaded through the tube such that the tube surrounds the cable. The isolating unit may have two components, features, or compartments. One component, feature, or compartment may surround, wrap around, or be external to the cable. Another component or compartment may be at least partially internal to the cable or may surround the cable. For example, the isolating unit may comprise a liquid coolant feature comprising a tube or pipe that allows fluid to flow. The tube or pipe may be disposed internal to the cable such that the wires of the cable surround the tube or pipe. The external feature of the isolating unit may then surround the cable. Alternatively, or in addition to, the tube or pipe may surround the cable or be wrapped around the cable such that a layer of liquid coolant may form around the cable or around portions of the cable. The external feature of the isolating cable may then surround the internal feature. The isolating unit may comprise a single feature that surrounds the cable. The external feature may comprise a thermally and electrically insulating material, such as a plastic material. The internal feature may comprise a material with high thermal conductivity, such as, for example, metals (e.g., copper, aluminum, iron, steel, etc.), non-metal conductors (e.g., graphite or silicon), heat transfer fluids, or any combination thereof.

The isolating unit may have a cross-sectional shape (e.g., circular, square, rectangular, etc.) that is the same as the cross-sectional shape of the cable. Alternatively, or in addition to, the cross-sectional shape of the isolating unit may be different than the cross-sectional shape of the cable. The isolating unit may have a larger cross-sectional are (e.g., area represented by a plane perpendicular to the direction of fluid flow) than the cable. A cross-sectional area of the isolating unit may be greater than or equal to 2%, 4%, 6%, 8%, 10%, 15%, 20%, 25%, 30%, 40%, 50%, 100%, 150%, 200%, 300%, 400%, 500%, or greater than a cross-sectional area of the cable. A cross-sectional area of the isolating unit may be less than or equal to 500%, 400%, 300%, 200%, 150%, 100%, 50%, 40%, 30%, 25%, 20%, 15%, 10%, 8%, 6%, 4%, 2%, or less than a cross-sectional area of the cable.

The isolating unit may have one end attached to a charging station. The charging station may comprise the compressor and fluid flow line. The end of the isolating unit attached to the charging station may have a liquid fluid inlet and a vapor fluid outlet. The vapor fluid outlet may have or be configured to have a barrier to prevent the flow of liquid coolant from the isolating unit to the fluid flow line. The liquid coolant inlet may have a shut-off valve or a drip system. The drip system may comprise a drip irrigation pipe or drip line that drips or flows liquid coolant at a low flow rate onto the source of thermal energy. For example, a drip line may flow liquid coolant at a low enough flow rate that the liquid coolant forms droplets that flow along the surface of the cable. The shut-off valve may control the flow of liquid coolant into the isolating unit. The shut-off valve may be a mechanical, electronic, or pneumatic valve. The shut-off valve may close if the level of liquid coolant within the isolating unit reaches a maximum level and may open if the level of liquid coolant within the isolating unit goes below a minimum level. In an example, the maximum level and minimum level are substantially the same level. The maximum level in the isolating unit may be less than or equal to about 95%, 90%, 80%, 70%, 60%, 50%, 40%, 30%, 20%, 10%, or less of the total evaporator height. The maximum level in the isolating may be greater than or equal to about 10%, 20%, 30%, 40%, 50%, 60%, 70%, 80%, 90%, 95%, or more of the total evaporator height. The level of liquid coolant in the isolating unit may be controlled to be between about 10% and 20%, 10% and 30%, 10% and 40%, 10% and 50%, 10% and 60%, 10% and 70%, 10% and 80%, 10% and 90%, or 10% and 95% of the total evaporator height.

Figure 7A:
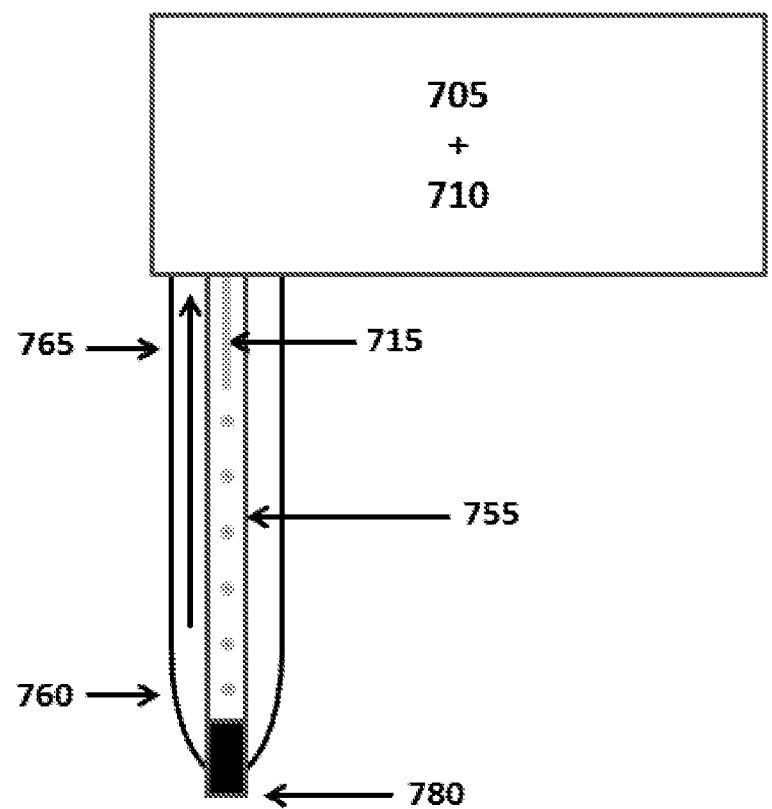
FIGS. 7A and 7B illustrate example thermal regulation systems for regulating the temperature of a cable.
Figure 7A:
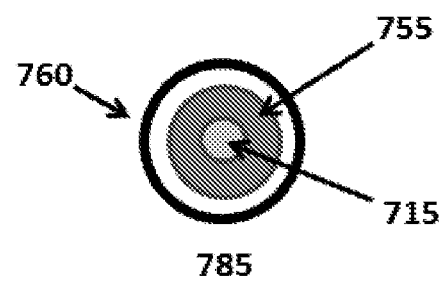
Figure 7B:
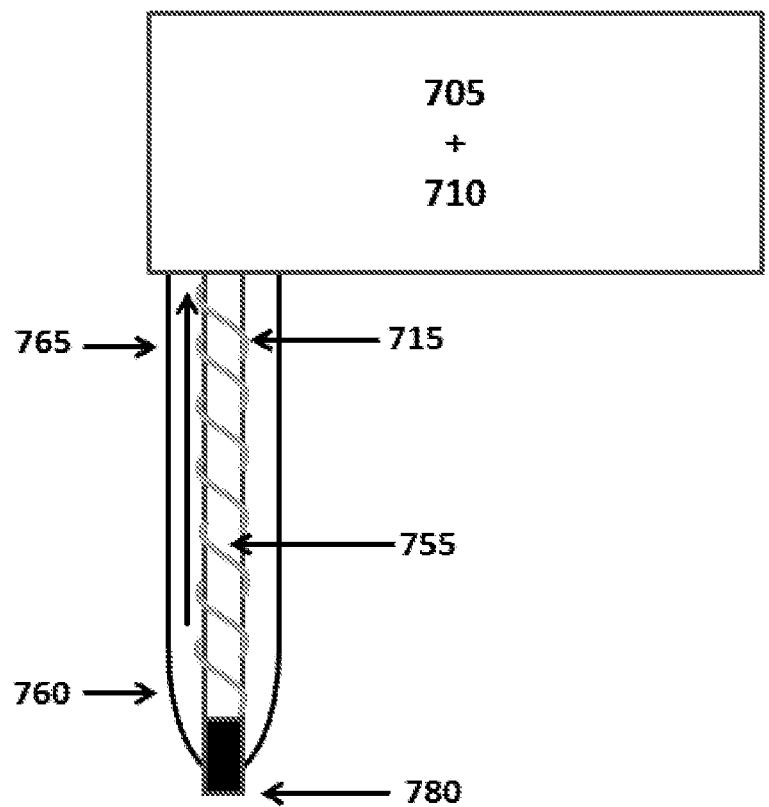
Figure 7B:
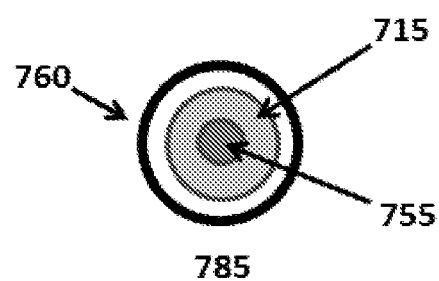

FIGS. 7A and 7B illustrate example thermal regulation systems for regulating the temperature of a cable. FIG. 7A shows a thermal regulation system 701 with a liquid coolant internal to the cable 755 with an electrical connector 780. The isolating unit 760 may comprise an external portion and an internal portion. When viewed in cross-section 785, the isolating unit 760 may have an internal portion with a liquid coolant in the center of the cable 755. The cable 755 may then be surrounded by the external portion of the isolating unit 760. The internal portion may have a liquid coolant inlet 715 in fluid communication with a portion of the isolating unit internal to the cable 755. The liquid coolant inlet 715 may drip or flow liquid coolant into the cable 755. The liquid coolant may evaporate to form a vapor coolant. The vapor coolant may exit or leave the isolating unit 760 through a vapor coolant outlet 765. The vapor coolant may then be directed to the condenser 705 to emit thermal energy and regenerate the liquid coolant. The condenser may have a fan 710 that aids in the dissipation of thermal energy from the vapor coolant. FIG. 7B shows a similar thermal regulation system 702 with a liquid coolant external to the cable 755. The isolating unit 760 may comprise a single portion that surrounds the cable 755 and the liquid coolant may drip or flow from the liquid coolant inlet 715 along the cable 755. Alternatively, or in addition to, the isolating unit 760 may comprise a portion that is wrapped around the cable 755. The portion of the isolating unit 760 wrapped around the cable 755 may comprise a hollow center that allows for fluid to flow along a long dimension of the isolating unit 760.

In another aspect, the present disclosure provides systems for thermal regulation of one or more heat emitting devices. The system may comprise one or more restrictors, one or more cooling interfaces, a fluid flow line, and a condenser. The restrictors may be configured to restrict a flow of a liquid coolant through the system. For example, a restrictor may be positioned between a liquid reservoir and a cooling interface. The restrictor may restrict the flow of a liquid coolant from the liquid reservoir to the cooling interface. The cooling interfaces may be in fluid communication with the restrictors and thermal communication with one or more heat emitting devices. The cooling interfaces may be configured to permit transfer of thermal energy from the one or more heat emitting devices to a liquid coolant such that at least a portion of the liquid coolant undergoes a phase transition to a vapor coolant. The fluid flow line may be in fluid communication with the cooling interfaces and the restrictors. The fluid flow line may be configured to accept the vapor coolant from the cooling interfaces. The condenser may be in fluid communication with the fluid flow line and the restrictors. The condenser may be configured to permit the vapor coolant to expel thermal energy and undergo phase transition to the liquid coolant.

The one or more cooling interfaces may be any type of cooling interface disclosed herein. For example, the one or more cooling interfaces may include one or more cooling units, one or more microchannel evaporators, one or more evaporators, one or more isolating units, or any combination thereof. The cooling interfaces may be arranged in a parallel or series configuration. Cooling interfaces arranged in a parallel configuration may each have one or more restrictors in direct fluid communication such that a restrictor is not shared between multiple cooling interfaces. Alternatively, or in addition to, cooling interfaces arranged in a parallel configuration may share restrictors. Cooling interfaces arranged in a series configuration may share restrictors. Alternatively, or in addition to, cooling interfaces arranged in a series configuration may have restrictors disposed between the cooling interfaces. The cooling interfaces may be arranged in both a series and parallel configuration (e.g., series of cooling interfaces may be arranged in parallel). The system may have greater than or equal to about 1, 2, 4, 6, 8, 10, 20, 30, 40, 50, 75, 100, or more cooling interfaces. The system may have greater than or equal to about 1, 2, 4, 6, 8, 10, 20, 30, 40, 50, 75, 100, or more restrictors. The number of restrictors may be equal to, less than, or greater to the number of cooling interfaces.

The restrictor may reduce the flow of a liquid or vapor coolant. The restrictor may be disposed between the condenser and the cooling interface. In a system with a liquid coolant reservoir, the restrictor may be disposed between the condenser and the liquid reservoir or between the liquid reservoir and the cooling interface. In an example, restrictors are disposed both between the condenser and the liquid reservoir and between the liquid reservoir and the cooling interface. A restrictor may include a set flow rate or the flow rate may be variable. A flow rate from the restrictor may be fixed or may be adjustable. The restrictor may include a mechanical, pneumatic, or electronic adjustment. The restrictors may be adjusted manually or automatically. The restrictors may be individually adjusted or may be adjusted as a group. The restrictor may decrease a flow rate of the coolant by at least about 1%, 5%, 10%, 15%, 20%, 25%, 30%, 40%, 50%, 60%, 70%, 80%, 90%, or more.

The thermal regulation systems may be operated at high pressure (e.g., pressure greater than or equal to 2 atm), atmospheric pressure, or low pressure (e.g., pressure less than 2 atm). In an example, the system is a low pressure (e.g., vacuum) thermal regulation system. The pressure of the thermal regulation system may be constant throughout the system or may vary throughout the system. For example, the pressure may be greater in the condenser than in the fluid flow line or at the cooling unit, microchannel evaporator, evaporator, or isolating unit. The pressure of the system may be less than or equal to about 5 atmospheres (atm), 4 atm, 3 atm, 2 atm, 1.5 atm, 1 atm, 0.8 atm, 0.6 atm, 0.4 atm, 0.2 atm, 0.1 atm, or less. The pressure of the system may be between about 5 atm and 0.1 atm, 4 atm and 0.1 atm, 3 atm and 0.1 atm, 2 atm and 0.1 atm, 1.5 atm and 0.1 atm, 1 atm and 0.1 atm, 0.8 atm and 0.1 atm, 0.6 atm and 0.1 atm, 0.4 atm and 0.1 atm, or 0.2 atm and 0.1 atm. The pressure in the condenser may be greater than or equal to about 0.5 atm, 1 atm, 1.5 atm, 2 atm, 4 atm, 6 atm, 8 atm, 10 atm, or greater. The pressure of the condenser may be between about 0.5 atm and 1 atm, 0.5 atm and 1.5 atm, 0.5 atm and 2 atm, 0.5 atm and 4 atm, 0.5 atm and 6 atm, 0.5 atm and 8 atm, or 0.5 atm and 10 atm. The pressure at the cooling unit, microchannel evaporator, evaporator, or isolating unit may be less than or equal to about (atm), 4 atm, 3 atm, 2 atm, 1.5 atm, 1 atm, 0.8 atm, 0.6 atm, 0.4 atm, 0.2 atm, 0.1 atm, or less. The pressure at the cooling unit, microchannel evaporator, evaporator, or isolating unit may be between about 5 atm and 0.1 atm, 4 atm and 0.1 atm, 3 atm and 0.1 atm, 2 atm and 0.1 atm, 1.5 atm and 0.1 atm, 1 atm and 0.1 atm, 0.8 atm and 0.1 atm, 0.6 atm and 0.1 atm, 0.4 atm and 0.1 atm, or 0.2 atm and 0.1 atm. The difference in pressure between the cooling unit, microchannel evaporator, evaporator, or isolating unit and other portions of the system (e.g., condenser, flow generator, fluid flow line) may be greater than or equal to about zero atm, 0.1 atm, 0.2 atm, 0.4 atm, 0.6 atm, 0.8 atm, 1 atm, 1.5 atm, 2 atm, 4 atm, 6 atm, 8 atm, 10 atm, or more. The difference in pressure between the cooling unit, microchannel evaporator, evaporator, or isolating unit and other portions of the system (e.g., condenser, flow generator, channels) may be less than or equal to about 10 atm, 8 atm, 6 atm, 4 atm, 2 atm, 1.5 atm, 1 atm, 0.8 atm, 0.6 atm, 0.4 atm, 0.2 atm, 0.1 atm, or less.

The thermal regulation system may further include one or more vacuum generators. The vacuum generator may control a pressure of the at least a portion of the system and may direct fluid flow through the system. For example, the vacuum generator may control a pressure of the coolant. Controlling the pressure of the coolant may permit controlling a boiling point of the coolant. Controlling the boiling point of the coolant may control the amount of heat transferred to or from a source of thermal energy and, thus, may control a temperature of the source of thermal energy. The vacuum generator may be used alone or the vacuum generator may be used together with other flow restricting or modulating devices (e.g., flow generators, restrictors, valves, etc.) In an example, a vacuum generator is used with shut-off valve such that the vacuum generator creates a lower pressure upstream (e.g., in the cooling unit, microchannel evaporators, evaporators, isolating unit, or fluid flow line) of the shut-off valve. The vacuum generator may permit active heat pumping to reduce the temperature of a source of thermal energy below ambient temperatures (e.g., the temperature of the surroundings). The vacuum generator may be a vacuum pump such as a diaphragm pump, a rotary vane pump, a piston pump, a scroll pump, screw pump, or roots blower. The vacuum generator may be in fluid communication with the fluid flow line and may direct vapor coolant from the cooling unit, microchannel evaporators, evaporator, or isolating unit to the condenser. The vacuum generator may control the pressure within the fluid flow line, the cooling unit, microchannel evaporators, evaporator, and isolating unit. The vacuum generators may be the same type of vacuum generator. Alternatively, the system may not include a vacuum generator. The vacuum generator may be controlled by a control unit that can activate the vacuum generator when a temperature threshold is reached or when faster heat removal is required. The vacuum generator may permit the system to operate at a low pressure (e.g., less than 2 atm). Such low pressure system may operate, for example, at a pressure that is less than or equal to about 2 atm, 1.5 atm, 1 atm, 0.5 atm, 0.1 atm, or less (e.g., under vacuum). For example, the vacuum generator may generate a vacuum that directs flow of the coolant in its liquid form and/or its gaseous form. The vacuum generator may direct fluid at a volumetric flow rate of greater than or equal to about 0.5 liters per hour (L/h), 1 L/h, 2 L/h, 5 L/h, 10 L/h, 20 L/h, 30 L/h, 40 L/h, 50 L/h, 100 L/h, 200 L/h, 300 L/h, 400 L/h, 500 L/h, 1,000 L/h, 2,000 L/h, 3,000 L/h, 4,000 L/h, 5,000 L/h, 10,000 L/h, 20,000 L/h, 30,000 L/h, 40,000 L/h, or greater. The vacuum generator may direct fluid at a volumetric flow rate of less than or equal to about 40,000 L/h, 30,000 L/h, 20,000 L/h, 10,000 L/h, 5,000 L/h, 4,000 L/h, 3,000 L/h, 2,000 L/h, 1,000 L/h, 500 L/h, 400 L/h, 300 L/h, 200 L/h, 100 L/h, 50 L/h, 40 L/h, 30 L/h, 20 L/h, 10 L/h, 5 L/h, 2 L/h, 1 L/h, 0.5 L/h, or less.

The thermal regulation system may be a multiphase system. Different components of the system may comprise different phases of the coolant. The condenser may comprise the vapor coolant, liquid coolant, or both the vapor and liquid coolant. The liquid reservoir may comprise the vapor coolant, liquid coolant, or both the vapor and liquid coolant. In an example, the liquid reservoir comprises either all liquid coolant (e.g., single phase) or comprises predominantly liquid coolant. The cooling unit, microchannel evaporators, evaporator, and/or isolating unit may comprise the vapor coolant, liquid coolant, or both the vapor and liquid coolant. The fluid flow line may comprise the vapor coolant, liquid coolant, or both the vapor and liquid coolant. In an example, the fluid flow line comprises either all vapor coolant (e.g., single phase) or comprises predominantly vapor coolant.

The thermal regulation system may include one or more coolants or cooling agents. The coolant may be a heat transfer fluid. Non-limiting examples of heat transfer fluids may include halon replacement fluids (e.g., Novec fluids), R245fa, R123, R514a, other low pressure coolants, or any combination thereof. The coolant may be a refrigerant, a dielectric fluid, or any fluid with a high latent heat of evaporation. The liquid coolant may be non-corrosive and may be compatible with electronic components (e.g., energy storage devices and charging cables). The liquid coolant may also be non-toxic and non-flammable. The coolant may comprise aromatic, silicate-ester, aliphatic, silicone, or fluorocarbon compounds. The coolant may include alcohol, water, glycol, a salt solution, or any combination thereof. The thermal regulation system may be provided empty (e.g., without any coolant) and coolant may be added to the system after installation of the thermal regulation system. Thermal regulation of a heat source may be achieved through liquid coolant vaporization. Vaporization may be achieved by applying vacuum onto the coolant or cooling agent within the cooling unit, microchannel evaporators, evaporator, or isolating unit. Alternatively, or in addition to, vaporization may be achieved by allowing the coolant to evaporate and evacuating the gaseous coolant. The coolant or cooling agent may vaporize at less than or equal to about 1 atm at a low temperature. The coolant may vaporize at a pressure of less than or equal to about 1 atm and a temperature between about 0° C. to about 40° C., about 0° C. to about 30° C., about 0° C. to about 20° C., about 0° C. to about 10° C., about 5° C. to about 25° C., about 10° C. to about 25° C., about 15° C. to about 25° C., or from about 5° C. to about 20° C. The coolant or cooling agent may vaporize at 25° C. at a pressure of from about 0 atm to about 1 atm, from about zero atm to about 0.8 atm, from about zero atm to about 0.5 atm, from about zero atm to about 0.3 atm, or from about zero atm to about 0.1 atm.

The evaporated coolant may be removed or taken away from the cooling unit, microchannel evaporators, evaporator, or isolating unit and directed to the condenser. The condenser may condense the vapor coolant to form a liquid coolant. The absorbed heat may be emitted from the condenser to the surrounding environment (e.g., surrounding air) or to another device. The condenser may include a fan or other mechanism to facilitate transfer of thermal energy from the vapor coolant to the surrounding environment. The liquid coolant may flow from the condenser to a liquid cooling reservoir or directly to the cooling unit, microchannel evaporators, evaporator, or isolating unit. Alternatively, or in addition to, the liquid coolant may flow from the condenser to a flow generator or other vacuum component of the system.

The thermal regulation system may further include a flow generator. The flow generator may be a pump, compressor, educator, or any other device designed to direct fluid flow. The thermal regulation system may include at least 1, 2, 3, 4, 5, or more flow generators. The flow generators may be the same type of flow generator. Alternatively, the system may not include a flow generator. The flow generator may be controlled by a control unit that can activate the flow generator when a temperature threshold is reached or when faster thermal energy removal is required. The flow generator may permit the system to operate at a low pressure (e.g., less than 2 atm). Such a low pressure system may operate, for example, at a pressure that is less than or equal to about 2 atm, 1.5 atm, 1 atm, 0.5 atm, 0.1 atm, or less (e.g., under vacuum). For example, the flow generator may generate a vacuum that directs flow of the coolant in its liquid form and/or its gaseous form. The flow generator may direct fluid at a volumetric flow rate of greater than or equal to about 0.5 liters per hour (L/h), 1 L/h, 2 L/h, 5 L/h, 10 L/h, 20 L/h, 30 L/h, 40 L/h, 50 L/h, 100 L/h, 200 L/h, 300 L/h, 400 L/h, 500 L/h, 1,000 L/h, 2,000 L/h, 3,000 L/h, 4,000 L/h, 5,000 L/h, 10,000 L/h, 20,000 L/h, 30,000 L/h, 40,000 L/h, or greater. The flow generator may direct fluid at a volumetric flow rate of less than or equal to about 40,000 L/h, 30,000 L/h, 20,000 L/h, 10,000 L/h, 5,000 L/h, 4,000 L/h, 3,000 L/h, 2,000 L/h, 1,000 L/h, 500 L/h, 400 L/h, 300 L/h, 200 L/h, 100 L/h, 50 L/h, 40 L/h, 30 L/h, 20 L/h, 10 L/h, 5 L/h, 2 L/h, 1 L/h, 0.5 L/h, or less.

The flow generator may direct fluid flow from the condenser, through a channel to the cooling unit, microchannel evaporators, evaporator, or isolating unit. The flow generator may direct fluid flow from the cooling unit, microchannel evaporators, evaporator, or isolating unit condenser, through a fluid flow line to the condenser. The flow generator may be disposed between the condenser and the cooling unit, microchannel evaporators, evaporator, or isolating unit. The flow generator may be disposed between the cooling unit, microchannel evaporators, evaporator, or isolating unit and the condenser.

The system may include a 2, 3, 4, 5, 6, 8, 10, or more fluid flow lines. In an example, the system includes a first fluid flow line and a second fluid flow line. The first fluid flow line may direct the flow of liquid coolant and the second fluid flow line may direct the flow of vapor coolant. The fluid flow line may be flexible or ridged. The fluid flow line may be formed of thermally insulating materials (e.g., plastics). The first and second fluid flow line may be formed of the same materials or may be formed of different materials. The fluid flow line may have a cross-sectional area that is constant or that varies. The first and the second fluid flow line may have the same cross-sectional area or may have different cross-sectional areas. For example, the cross-sectional area of the first fluid flow line (e.g., the channel directing the liquid coolant) may be smaller than the cross-sectional area of the second fluid flow line (e.g., the channel directing the vapor coolant).

The system may further comprise a plurality of shut-off valves. The shut-off valves may be disposed between the first fluid flow line and the liquid reservoir, cooling unit, microchannel evaporators, evaporator, or isolating unit. The system may comprise a single shut-off valve or multiple shut of valves. The shut-off valve may be a metered valve (e.g., controls the flow rate of the fluid) or may be a discrete valve (e.g., valve comprising an open state and a closed state). The shut-off valve may be designed to allow liquid coolant to enter the liquid reservoir, cooling unit, microchannel evaporators, evaporator, or isolating unit, while preventing back-flow of the liquid coolant or vapor coolant.

The shut-off valve may be a mechanical or electric valve. The shut-off valve may be controlled by a control unit or may be physically controlled (e.g., by liquid coolant level). In an example, the shut-off valve is a float valve designed to prevent liquid coolant from entering the associated liquid reservoir, cooling unit, microchannel evaporator, evaporator, or isolating unit when the liquid coolant within the cooling interface unit reaches a predefined level/amount. For example, when the liquid level is below a threshold volume or level, the float valve may be in an open position and allow liquid coolant to flow. When the liquid level reaches the threshold volume or level the float valve may be in a closed interface and prevent liquid coolant from flowing. Using a float valve may reduce the use of a flow generator to continuously flow the coolant through the system which may reduce maintenance costs and redundant flow generators. The shut-off valve may control a level of liquid coolant within the reservoir. The reservoir may be a liquid coolant reservoir. The system may or may not comprise a liquid coolant reservoir. The level of fluid within the liquid coolant reservoir may control a level of fluid in the cooling unit, microchannel evaporators, evaporator, or isolating unit. The reservoir may be disposed between the condenser and the cooling unit, microchannel evaporators, evaporator, or isolating unit. The reservoir may comprise a pipe, tube, conduit or other receptacle. The reservoir may provide liquid coolant directly to the cooling unit, microchannel evaporators, evaporator, or isolating unit.

A float shut-off valve may increase the efficiency of the thermal regulation system because liquid coolant may enters the liquid reservoir, cooling unit, microchannel evaporators, evaporator, or isolating unit when the liquid coolant level drops below a threshold level. The reduction in the liquid coolant volume or level may be indicative of on-going heat removal from the heat source. Thus, the efficiency of the system may be increased because coolant is being delivered to the liquid reservoir, cooling unit, microchannel evaporators, evaporator, or isolating unit during heat removal and not when heat is not being removed. Moreover, the rate and speed of liquid coolant entering the liquid reservoir, cooling unit, microchannel evaporators, evaporator, or isolating unit may be controlled by the rate of evaporation, which may be equivalent to the amount of heat to be removed. This may permit autonomous or on demand temperature control of the heat source to be cooled. A thermal regulation system comprising a shut-off valve may be advantageous because the liquid coolant does not flow continuously. The liquid coolant may enter the liquid reservoir, cooling unit, microchannel evaporators, evaporator, or isolating unit of the system and vapor or gaseous coolant may exit or leave the cooling unit, microchannel evaporators, evaporator, or isolating unit. The shut-off valve may prevent liquid coolant, vapor coolant, or both liquid and vapor coolant from entering the first fluid flow line. In an example, the shut-off valve permits the thermal regulation system to be autonomous (e.g., to not use a control system to control the amount and speed of liquid coolant that is pumped through the system or the speed of removal of the vapor or gaseous coolant from the cooling unit, microchannel evaporators, evaporator, or isolating unit).

The shut-off float valve may be a mechanical shut-off valve. The specific gravity of the float portion of the valve may be less than the specific gravity of the coolant. Accordingly, when no external forces are applied other than the force of the coolant level rising, the shut-off valve may be lifted and block or close the coolant flow path. As the coolant evaporates, the liquid level may decrease and the valve may lower and open or unblock the coolant flow path. Once the liquid coolant level within the cooling interface begins to drop, the valve may automatically open to allow liquid coolant to enter the liquid coolant flow path. The flow rate of the liquid coolant into the liquid reservoir, cooling unit, microchannel evaporator, evaporator, or isolating unit may directly correlate to the amount of gaseous or vapor coolant exiting the cooling unit, microchannel evaporator, evaporator, or isolating unit. The amount of vapor coolant generated may be a direct effect of the heat generated by the heat source to be cooled. Using a shut-off float valve may eliminate the use of sophisticated and complex controlling and adjusting mechanism(s) and monitoring of the cooling process. In an example, the forces induced by the specific gravity differences (e.g., between the valve specific gravity and the coolant specific gravity), is high enough to block, partially block, or meter the flow of liquid coolant to or through the liquid coolant inlet. The shut-off valve may include additional components such as springs, diaphragms, pneumatic components, or additional fluids to permit the valve to block, partially block, or meter flow of the liquid coolant.

Alternatively, or in addition to, the thermal regulation system may further comprises a control unit for controlling the amount and speed of liquid coolant pumped through the system. The control unit may control the removal speed of coolant vapors from the cooling unit, microchannel evaporators, evaporators, or isolating unit and/or the flow of ambient air through cooling fins of the condenser (e.g., fan speed). In an example, the liquid coolant flow rate and/or the gaseous coolant flow rate is controlled by at least one pressure regulator associated with flow generator.

The thermal regulation system may further comprise a power source, such as power supply or a battery. The system may be connected directly to the main power grid. Alternatively, or in addition to, the thermal regulation system may be located within an electric vehicle and may be powered by the vehicle.

The thermal regulation system may be used to cool any type of heat source. For example, the thermal regulation system may be used to cool energy storage devices, charging cables or other electronic component which generates heat (e.g., a computer or any other electronic device). The thermal regulation system may be used to regulate the thermal energy of an energy storage device. The energy storage device may be a solid state battery, liquid metal battery, electrochemical battery, or any other energy storage device. The thermal regulation system may maintain a temperature of an energy storage device, cell of the energy storage device, or cable in a certain temperature range. The thermal regulation system may maintain the temperature between about 5° C. and 10° C., 5° C. and 15° C., 5° C. and 20° C., 5° C. and 25° C., 5° C. and 30° C., 5° C. and 35° C., 5° C. and 40° C., 5° C. and 45° C., 5° C. and 50° C., 5° C. or 60° C., 5° C. or 70° C., or 5° C. and 80° C. In an example, the thermal regulation system maintains the energy storage device, individual cells of the energy storage device, cable, or electronic component between about 15° C. and 35° C.

The thermal regulation system may include one or more a controllers for controlling the operation of the system. The controller may control flow of the coolant, rate of condensation of the coolant, temperature thresholds for providing coolant, or any combination thereof. The system may comprise one or more flow restrictors. The flow restrictors may comprise orifices or expansion chambers. The flow restrictor may be in fluid communication with the fluid flow lines (e.g., the first or second fluid flow lines). The flow restrictor may be in fluid communication with the coolant reservoir, cooling unit, microchannel evaporators, evaporator, or isolating unit. The flow restrictor may be disposed in a fluid flow line between the condenser and the liquid coolant reservoir, cooling unit, microchannel evaporators, evaporator, or isolating unit. The flow restrictor (e.g., orifice) may decrease the pressure within the coolant reservoir, cooling unit, microchannel evaporators, evaporator, or isolating unit. The expansion chamber or container may accumulate liquid coolant prior to providing the liquid coolant to the coolant reservoir, cooling unit, microchannel evaporators, evaporator, or isolating unit. The thermal regulation system may include one or more splitters that split the fluid flow lines or paths (e.g., coolant and vacuum). The thermal regulation system may include coolant pipes in which the coolant flows. The coolant pipes may be flexible and made of any suitable material, such as plastic, rubber, silicone, polyurethane, or metal.

The thermal regulation system may include power wires or communication wires. The power wires may provide power to the thermal regulation system or heat source. The communication wires may be in communication with the controller and may permit the controller to control the thermal regulation system. The system may include a user interface for displaying the temperature at the cooling unit, microchannel evaporator, evaporator, isolating unit and/or the surroundings. The user interface may be any screen, such as a computer screen, a tablet or a smart phone, or a screen attached to or associated with the thermal regulation system or the heat source. The system may include one or more thermocouples or temperature sensors. The thermocouples may be in communication with the controller and may permit automatic activation of the system when the temperature reaches a temperature threshold. The temperature threshold may be greater than or equal to about 10° C., 15° C., 20° C., 25° C., 30° C., 35° C., 40° C., 45° C., 50° C., 60° C., 70° C., 80° C., 90° C., 100° C., 110° C., 120° C., or greater. The thermocouple may signal the controller to direct coolant to the cooling interfaces when the temperature is above the temperature threshold. The thermocouple may signal the controller to stop directing coolant to the cooling interfaces when the temperature is below the temperature threshold. The system may include a transmitter for transmitting date (e.g., temperature or coolant flow rate) to a remote computer or smart phone, either constantly or periodically. The system may include a computer processor and memory. The computer processor and memory may control the thermal regulation system and store data from the system and heat source.

The thermal regulation system may further comprise pump or pumps that may assist in flowing the coolant and/or coolant vapors in the system, as well as a filter or filtration subsystem that allows filtration of the coolant and thus prevent possible clogging of the system.

The thermal regulation system may comprise at least one sensor. The sensor may permit the system to sense that the temperature of either the heat source or the surroundings has exceeded predetermined temperature (e.g., a temperature at which the heat source may be damaged, function inefficiently, or become inoperable). The sensors may sense the charge level of the energy storage device or individual cells of the energy storage device. The sensors may sense the temperature of the energy storage device, individual cell, changing and discharging cables, or other electronic components. The sensors may sense the ambient temperature around the energy storage device, cables, or other electronic components. In an example, the thermal regulation system is used to regulate the thermal energy of a hybrid or electric vehicle and the sensor senses the temperature or heating requirement of the passenger cabin. The sensor may send an alert, turn the thermal regulation system on, or increase the activity of the thermal regulation system by increasing work load, and/or execute an emergency shutdown of the heat source or the entire electronic system comprising the heat source.

The thermal regulation system may comprise a thermostat. The thermostat may permit the system to activate and regulate thermal energy of an energy storage device, electronic device, or cable when the threshold temperature of the source of thermal energy or temperature of the surroundings has been reached. Operating the thermal regulation system when the threshold temperature has been reached and not when the threshold temperature has not been reached may increase efficiency of the system and reduce resource use (e.g., power).

The thermal regulation system may comprise a heating unit. The heating unit may be a resistive heater, radiant heater, cable heater, or any other type of heater. The heating unit may be in thermal communication with the liquid coolant. The heater may be disposed in the liquid coolant reservoir, the cooling unit, the microchannel evaporators, the evaporator, or the isolating unit. The heating unit may increase the temperature of the liquid coolant. The liquid coolant may then increase the temperature of the energy storage device, cable, or other electronic component. The heating unit may raise the temperature of the liquid coolant above the boiling point of the liquid coolant or may raise the temperature to below the boiling point of the liquid coolant. The system may be operated at a high pressure (e.g., greater than or equal to 1 atm) when the system is being used to heat an energy storage device, cable, or electronic component. The heating unit may be used when a lower threshold temperature is reached. The lower threshold temperature may be a temperature less than or equal to about 50° C., 45° C., 40° C., 35° C., 30° C., 25° C., 20° C., 15° C., 10° C., 5° C., or lower. The heating unit may increase the temperature of the energy storage device, cable, or electronic component to greater than or equal to 5° C., 10° C., 15° C., 20° C., 25° C., 30° C., 35° C., 40° C., 45° C., 50° C., or greater.

The system may be controlled by a control unit or may be self-regulating. Such self-regulation may be employed using a shut-off valve, such as a float valve. Such self-regulation may be employed in the absence of a sensor that detects fluid level or fluid volume. The system may further comprise a pressure regulator that regulates the pressure of the liquid reservoir, cooling unit, microchannel evaporators, evaporator, isolating unit, condenser, channels, or any combination thereof. The pressure regulator may be in fluid communication with at least one of the first fluid flow line, the second fluid flow lint, the liquid reservoir, the cooling unit, the microchannel evaporators, the evaporators, the isolating unit, the condenser, the flow generator, or any combination thereof. In an example, the system comprises multiple pressure regulators and each pressure regulator may be in fluid communication with multiple components of the system. The pressure regulate may control the flow rate of the liquid coolant or the vapor coolant. In an example, the pressure regulator may be a back pressure regulator or an equivalent electronic mechanism. The back pressure regulator may prevent coolant evaporation at low temperatures.

The thermal regulation system may comprise a control unit. The control unit may control all aspects of the system or discrete portions of the system. The control unit may control the shut-off valve, the pressure regulator(s), the condenser, the flow generator, the vacuum generator, the heater, or any combination thereof. The control unit may be in electronic communication with one or more sensors. The one or more sensors may relay information to the control unit and the control unit may use the information from the sensors to alter or modify an aspect of the system. For example, if the fluid level in the liquid reservoir, cooling unit, microchannel evaporators, evaporator or isolating unit reaches a lower threshold, a sensor may sense the level of the liquid coolant, relay the level information to the control unit, and the control unit may open the shut-off valve to increase the level of coolant.

The control unit may comprise a control loop. The control loop may actively control the pressure of the vapor coolant within the system (e.g., within the cooling unit, microchannel evaporators, evaporator, isolating unit, or the fluid flow line). In an example, the control loop controls the pressure of the vapor coolant in the cooling unit, microchannel evaporators, evaporator, or isolating unit when the cooling unit, microchannel evaporators, evaporator, or isolating unit is in thermal communication with an energy emitting device (e.g., energy storage device, cable, electronic device, etc.).

The cooling loop may be in direct or indirect contact with the source of thermal energy (e.g., energy storage device, electronic device, cable, etc.). The cooling unit, microchannel evaporators, evaporator, of isolating unit may be in direct or indirect contact with the energy emitting device. The control loop may control the pressure and, therefore, the boiling point of the liquid coolant. Controlling the boiling point of the liquid coolant may, in turn, control the temperature of the energy emitting device (e.g., energy storage device, cable, electronic device, etc.). The control loop may actively control the pressure via a maze restrictor, a vacuum inducing device (e.g., vacuum pump), pressure inducing device, a controlled release valve (e.g., shut-off valve), or any combination thereof. The maze restrictor may be a restrictor with a tortuous or winding fluid flow path that is longer than the length of the restrictor. Controlling the pressure of the vapor coolant may control the boiling point of the coolant. In an example, the control loop comprises a pressure generating device (e.g., shut-off valve or flow generator) and vacuum generating device (e.g., orifice, vacuum pump, etc.). The control loop may generate 1, 2, 3, 4, 5, 8, 10 or more pressure zones within the fluid flow path. The multiple pressure zones may permit active heat pumping. The multiple pressure zones may permit the thermal regulation system to reduce a temperature of the source of thermal energy below the temperature of the surroundings (e.g., ambient temperature). For example, the pressure at the condenser may be higher than the pressure in the control unit, microchannel evaporators, evaporator, isolating unit, or fluid flow channel. The pressure zones may be generated by a flow generator, vacuum generator, one or more valves, restriction devices (e.g., one or more orifices), pressure regulators, or any combination thereof. In an example, the fluid flow path comprises two pressure zones. In one pressure zone (e.g., a condensing zone), the coolant may undergo a phase transition from a vapor coolant to a liquid coolant (e.g., condensing portion of the fluid flow path). In the condensing zone, thermal energy may be emitted from the coolant to the surroundings. In another pressure zone (e.g., evaporating zone), the coolant may undergo a phase transition from a liquid coolant to a vapor coolant (e.g., vaporizing portion of the fluid flow path). In the evaporating zone, thermal energy may be absorbed from a source of thermal energy (e.g., electronic device, energy storage device, etc.) to the coolant. The pressure in the evaporating zone may be lower than the pressure in the condensing zone. For example, the pressure in the evaporating zone may be less than or equal to about 90%, 80%, 70%, 60%, 50%, 40%, 30%, 25%, 20%, 15%, 10%, 5%, 4%, 3%, 2%, 1%, or less than the pressure in the condensing zone. The control loop may be in communication with one or more sensors and may modulate the pressure based on energy storage device charge level, temperature of the energy storage device, cells, or cables, or ambient temperature. The control loop may be in communication with any of the sensors disclosed herein and may use information from the sensors to modulate the pressure of the vapor coolant.

The thermal regulation system may be installed in a car (e.g., a hybrid or electric car) or may be installed at a charging station for a car. The system may comprise components that are internal to the car and external to the car. The energy storage device and any components contacting (e.g., the cooling unit, microchannel evaporators, or evaporators) may be internal to the car. The other system components (e.g., compressor, vacuum generator, flow generator, etc.) may be external to the car. In an example, all components of the system are internal to the car. The fluid flow lines may be connected to the system using quick disconnect connectors.

Methods for Thermal Regulation

In an aspect, the present disclosure provides methods for thermal regulation or thermal management of energy storage devices. The methods may comprise providing an energy storage device comprising one or more cells, a liquid coolant reservoir containing a liquid coolant, a cooling unit in fluid communication with the liquid coolant reservoir, a fluid flow line in fluid communication with the cooling unit, and a condenser in fluid communication with the fluid flow line and the liquid coolant reservoir. The energy storage device may be disposed internal to the coolant unit such at the one or more cells are at least partially submerged in the liquid coolant. Thermal energy may be transferred from the energy storage device or from one or more cells of the energy storage device in the cooling unit to the liquid coolant. The transfer of thermal energy (e.g., heat) from the energy storage device to the liquid coolant may permit the liquid coolant to undergo a phase transition to a vapor coolant. The vapor coolant may be directed from the cooling unit, along the fluid flow line, to the condenser. The condenser may permit the vapor coolant to emit thermal energy (e.g., heat) and undergo a phase transition to a liquid coolant to regenerate the liquid coolant. The liquid coolant may then be directed from the condenser to the liquid coolant reservoir.

In another aspect, the present disclosure provides methods for thermal regulation or thermal management of energy storage devices. The methods may comprise providing an energy storage device comprising one or more cells, a liquid coolant reservoir containing a liquid coolant, a plurality of microchannel evaporators in fluid communication with the liquid coolant reservoir and thermal communication with the energy storage device or the one or more cells of the energy storage device, a fluid flow line in fluid communication with the plurality of microchannel evaporators, and a condenser in fluid communication with the fluid flow line and the liquid coolant reservoir. Thermal energy may be transferred from the energy storage device or from one or more cells of the energy storage device to the liquid coolant in the plurality of microchannel evaporators. The transfer of thermal energy (e.g., heat) from the energy storage device to the liquid coolant may permit the liquid coolant to undergo a phase transition to a vapor coolant. The vapor coolant may be directed from the plurality of microchannel evaporators, along the fluid flow line, to the condenser. The condenser may permit the vapor coolant to emit thermal energy (e.g., heat) and undergo a phase transition to a liquid coolant to regenerate the liquid coolant. The liquid coolant may then be directed from the condenser to the liquid coolant reservoir.

In another aspect, the present disclosure provides methods for thermal regulation or thermal management of energy storage devices. The methods may comprise providing an energy storage device comprising one or more cells, an evaporator comprising a surface that is in thermal communication with the one or more cells, a fluid flow line in fluid communication with the evaporator, and a condenser in fluid communication with the fluid flow line and the evaporator. Thermal energy may be transferred from the energy storage device or from one or more cells of the energy storage device to the liquid coolant in the evaporator. The transfer of thermal energy (e.g., heat) from the energy storage device to the liquid coolant may permit the liquid coolant to undergo a phase transition to a vapor coolant. The vapor coolant may be directed from the evaporator, along the fluid flow line, to the condenser. The condenser may permit the vapor coolant to emit thermal energy (e.g., heat) and undergo a phase transition to a liquid coolant to regenerate the liquid coolant. The liquid coolant may then be directed from the condenser to the evaporator.

In another aspect, the present disclosure provides methods for thermal regulation or thermal management of a cable. The methods may comprise providing a cable, an isolating unit comprising a liquid coolant inlet and a vapor coolant outlet, a fluid flow line in fluid communication with the isolating unit, and a condenser in fluid communication with the fluid flow line and the isolating unit. The isolating unit may be disposed along a long dimension of the cable. The isolating unit may be in thermal communication with the cable along the long dimension. Thermal energy may be transferred from the cable to the liquid coolant in the isolating unit. The transfer of thermal energy (e.g., heat) from the cable to the liquid coolant may permit the liquid coolant to undergo a phase transition to a vapor coolant. The vapor coolant may be directed from the isolating unit, along the fluid flow line, to the condenser. The condenser may permit the vapor coolant to emit thermal energy (e.g., heat) and undergo a phase transition to a liquid coolant to regenerate the liquid coolant. The liquid coolant may then be directed from the condenser to the isolating unit.

The thermal regulation system may be a closed system or an open system. A closed system may be a system that is sealed from an ambient environment such that a fluid within the system does not leave the system. An open system may be a system that is not sealed from an ambient environment such that a fluid within the system may be added or removed from the system. The thermal regulation system may further comprise a closed loop circulatory fluid flow path that comprises the liquid reservoir, cooling unit, microchannel evaporators, or isolating unit and the fluid flow line and condenser. The closed loop circulatory fluid flow path may be a closed system. The closed loop system may have different coolant phases present in different portions of the system. The condenser may comprise liquid coolant, vapor coolant, or both liquid and vapor coolant. The liquid coolant reservoir may comprise liquid coolant, vapor coolant, or both liquid and vapor coolant. In an example, the liquid coolant reservoir comprises liquid coolant and does not comprise vapor coolant. The cooling unit, microchannel evaporators, evaporator, or isolating unit may comprise liquid coolant, vapor coolant, or both liquid coolant and vapor coolant. The coolant may undergo a phase transition from a liquid coolant to a vapor coolant in the cooling unit, microchannel evaporators, evaporator, or isolating unit. The fluid flow line may comprise liquid coolant, vapor coolant, or both liquid and vapor coolant. In an example, the fluid flow line comprises vapor coolant and does not comprise liquid coolant. The method may comprise activating the closed loop or open loop system.

The activation of the thermal regulation system may be automatic (e.g., self-regulating) when a threshold temperature (e.g., low threshold temperature or high threshold temperature) is reached or may be controlled by a controller. The temperature of the system and source of thermal energy (e.g., energy storage device, cable, or electronic component) may be monitored or the temperatures may not be monitored. The coolant flow rate of the system may increase or decrease as the temperature of the source of thermal energy increases and decreases, respectively. The coolant flow rate may be self-regulated or controlled by a flow generator or vacuum generator.

The thermal regulation system may further comprise a flow generator and the method may comprise activating the flow generator. The flow generator may be a pump, compressor, educator, or any other device designed to direct fluid flow. The thermal regulation system may include at least 1, 2, 3, 4, 5, or more flow generators. The flow generators may be the same type of flow generator. Alternatively, the system may not include a flow generator. The flow generator may be controlled by a control unit that can activate the flow generator when a temperature threshold is reached or when faster thermal energy removal is required. The flow generator may permit the system to operate at a low pressure (e.g., less than 2 atm). Such a low pressure system may operate, for example, at a pressure that is less than or equal to about 2 atm, 1.5 atm, 1 atm, 0.5 atm, 0.1 atm, or less (e.g., under vacuum). For example, the flow generator may generate a vacuum that directs flow of the coolant in its liquid form and/or its gaseous form. The flow generator may direct fluid at a volumetric flow rate of greater than or equal to about 0.5 liters per hour (L/h), 1 L/h, 2 L/h, 5 L/h, 10 L/h, 20 L/h, 30 L/h, 40 L/h, 50 L/h, 100 L/h, 200 L/h, 300 L/h, 400 L/h, 500 L/h, 1,000 L/h, 2,000 L/h, 3,000 L/h, 4,000 L/h, 5,000 L/h, 10,000 L/h, 20,000 L/h, 30,000 L/h, 40,000 L/h, or greater. The flow generator may direct fluid at a volumetric flow rate of less than or equal to about 40,000 L/h, 30,000 L/h, 20,000 L/h, 10,000 L/h, 5,000 L/h, 4,000 L/h, 3,000 L/h, 2,000 L/h, 1,000 L/h, 500 L/h, 400 L/h, 300 L/h, 200 L/h, 100 L/h, 50 L/h, 40 L/h, 30 L/h, 20 L/h, 10 L/h, 5 L/h, 2 L/h, 1 L/h, 0.5 L/h, or less. The flow generator may direct fluid flow from the condenser, through a channel to the cooling unit, microchannel evaporators, evaporator, or isolating unit. The flow generator may direct fluid flow from the cooling unit, microchannel evaporators, evaporator, or isolating unit condenser, through a fluid flow line to the condenser. The flow generator may be disposed between the condenser and the cooling unit, microchannel evaporators, evaporator, or isolating unit. The flow generator may be disposed between the cooling unit, microchannel evaporators, evaporator, or isolating unit and the condenser.

The thermal regulation system may further comprise a vacuum generator and the method may comprise activating the vacuum generator. The vacuum generator may control a pressure of the at least a portion of the system and may direct fluid flow through the system. For example, the vacuum generator may control a pressure of the coolant. Controlling the pressure of the coolant may permit controlling a boiling point of the coolant. Controlling the boiling point of the coolant may control the amount of heat transferred to or from a source of thermal energy and, thus, may control a temperature of the source of thermal energy. The vacuum generator may be used alone or the vacuum generator may be used together with other flow restricting or modulating devices (e.g., flow generators, restrictors, valves, etc.) In an example, a vacuum generator is used with shut-off valve such that the vacuum generator creates a lower pressure upstream (e.g., in the cooling unit, microchannel evaporators, evaporators, isolating unit, or fluid flow line) of the shut-off valve. The vacuum generator may permit active heat pumping to reduce the temperature of a source of thermal energy below ambient temperatures (e.g., the temperature of the surroundings). The vacuum generator may be a vacuum pump, such as a diaphragm pump, a rotary vane pump, a piston pump, a scroll pump, screw pump, or roots blower. The vacuum generator may be in fluid communication with the fluid flow line and may direct vapor coolant from the cooling unit, microchannel evaporators, evaporator, or isolating unit to the condenser. The vacuum generator may control the pressure within the fluid flow line, the cooling unit, microchannel evaporators, evaporator, and isolating unit. The vacuum generators may be the same type of vacuum generator. Alternatively, the system may not include a vacuum generator. The vacuum generator may be controlled by a control unit that can activate the vacuum generator when a temperature threshold is reached or when faster heat removal is required. The vacuum generator may permit the system to operate at a low pressure (e.g., less than 2 atm). Such low pressure system may operate, for example, at a pressure that is less than or equal to about 2 atm, 1.5 atm, 1 atm, 0.5 atm, 0.1 atm, or less (e.g., under vacuum). For example, the vacuum generator may generate a vacuum that directs flow of the coolant in its liquid form and/or its gaseous form. The vacuum generator may direct fluid at a volumetric flow rate of greater than or equal to about 0.5 liters per hour (L/h), 1 L/h, 2 L/h, 5 L/h, 10 L/h, 20 L/h, 30 L/h, 40 L/h, 50 L/h, 100 L/h, 200 L/h, 300 L/h, 400 L/h, 500 L/h, 1,000 L/h, 2,000 L/h, 3,000 L/h, 4,000 L/h, 5,000 L/h, 10,000 L/h, 20,000 L/h, 30,000 L/h, 40,000 L/h, or greater. The vacuum generator may direct fluid at a volumetric flow rate of less than or equal to about 40,000 L/h, 30,000 L/h, 20,000 L/h, 10,000 L/h, 5,000 L/h, 4,000 L/h, 3,000 L/h, 2,000 L/h, 1,000 L/h, 500 L/h, 400 L/h, 300 L/h, 200 L/h, 100 L/h, 50 L/h, 40 L/h, 30 L/h, 20 L/h, 10 L/h, 5 L/h, 2 L/h, 1 L/h, 0.5 L/h, or less.

The thermal regulation system may include a heating unit and the method may comprise activating the heating unit. The heater may be a resistive heater, radiant heater, cable heater, or any other type of heater. The heater may be in thermal communication with the liquid coolant. The heater may be disposed in the liquid coolant reservoir, the cooling unit, the microchannel evaporators, the evaporator, or the isolating unit. The heater may increase the temperature of the liquid coolant. The liquid coolant may then increase the temperature of the energy storage device, cable, or other electronic component. The heating unit may raise the temperature of the liquid coolant above the boiling point of the liquid coolant or may raise the temperature to below the boiling point of the liquid coolant. The system may be operated at a high pressure (e.g., greater than or equal to 1 atm) when the system is being used to heat an energy storage device, cable, or electronic component. The heating unit may be used when a lower threshold temperature is reached. The lower threshold temperature may be a temperature less than or equal to about 50° C., 45° C., 40° C., 35° C., 30° C., 25° C., 20° C., 15° C., 10° C., 5° C., or lower. The heating unit may increase the temperature of the energy storage device, cable, or electronic component to greater than or equal to 5° C., 10° C., 15° C., 20° C., 25° C., 30° C., 35° C., 40° C., 45° C., 50° C., or greater.

The method may include monitoring the temperature of the source of thermal energy (e.g., energy storage device, cable, or electronic component 0, the environment surrounding the source of thermal energy, or the cooling unit, microchannel evaporators, evaporator, or isolating unit. The temperature may be monitored by one or more thermocouples. The thermocouples may be in communication with a controller and may permit automatic activation of the thermal regulation system when the temperature reaches a temperature threshold. The temperature threshold may be greater than or equal to about 10° C., 15° C., 20° C., 25° C., 30° C., 35° C., 40° C., 45° C., 50° C., 60° C., 70° C., 80° C., 90° C., 110° C., 120° C., or greater. The thermocouple may signal the controller to direct coolant to the cooling interfaces when the temperature is above the temperature threshold. The thermocouple may signal the controller to stop directing coolant to the cooling interfaces when the temperature is below the temperature threshold.

The method may change or maintain the temperature of a source of thermal energy and/or the surroundings to a temperature of about 25° C. The temperature of the energy storage device, cell of the energy storage device, or cable may be maintained in a certain temperature range. The method may maintain the temperature between about 5° C. and 10° C., 5° C. and 15° C., 5° C. and 20° C., 5° C. and 25° C., 5° C. and 30° C., 5° C. and 35° C., 5° C. and 40° C., 5° C. and 45° C., 5° C. and 50° C., 5° C. or 60° C., 5° C. or 70° C., or 5° C. and 80° C. In an example, the method maintains the energy storage device, individual cells of the energy storage device, cable, or electronic component between about 15° C. and 35° C.

The thermal regulation system may comprise a shut-off valve. The method may comprise using the shut-off valve to control a level of liquid coolant in the coolant reservoir, cooling unit, microchannel evaporators, evaporator, or isolating unit. The shut-off valve may me a mechanical, electrical, pneumatic, or hydraulic shut-off valve. In an example, the shut-off valve is a float valve.

The shut-off float valve may be a mechanical shut-off valve. The specific gravity of the float portion of the valve may be less than the specific gravity of the coolant. Accordingly, when no external forces are applied other than the force of the coolant level rising, the shut-off valve may be lifted and block or close the coolant flow path. As the coolant evaporates, the liquid level may decrease and the valve may lower and open or unblock the coolant flow path. Once the liquid coolant level within the cooling interface begins to drop, the valve may automatically open to allow liquid coolant to enter the liquid coolant flow path. The flow rate of the liquid coolant into the liquid reservoir, cooling unit, microchannel evaporator, evaporator, or isolating unit may directly correlate to the amount of gaseous or vapor coolant exiting the cooling unit, microchannel evaporator, evaporator, or isolating unit. The amount of vapor coolant generated may be a direct effect of the heat generated by the heat source to be cooled. Using a shut-off float valve may eliminate the use of sophisticated and complex controlling and adjusting mechanism(s) and monitoring of the cooling process. In an example, the forces induced by the specific gravity differences (e.g., between the valve specific gravity and the coolant specific gravity), is high enough to block, partially block, or meter the flow of liquid coolant to or through the liquid coolant inlet. The shut-off valve may include additional components such as springs, diaphragms, pneumatic components, or additional fluids to permit the valve to block, partially block, or meter flow of the liquid coolant.

The shut-off valve may be mechanically controlled (e.g., float valve) or controlled by a control unit. Alternatively, or in addition to, the method may further comprise using a control unit for controlling the amount and speed of liquid coolant pumped through the system (e.g., by controlling the flow generator and/or condenser). The control unit may control the removal speed of coolant vapors from the cooling unit, microchannel evaporators, evaporators, or isolating unit and/or the flow of ambient air through cooling fins of the condenser (e.g., fan speed) or vacuum generator. In an example, the liquid coolant flow rate and/or the gaseous coolant flow rate is controlled by at least one pressure regulator associated with flow generator. The control unit may control the pressure regulator and flow generator.

The method may control the thermal regulation system by a control unit or the system may be self-regulating. Self-regulation may be employed using a shut-off valve, such as a float valve. Self-regulation may be employed in the absence of a sensor that detects fluid level or fluid volume. The system may further comprise a pressure regulator that regulates the pressure of the liquid reservoir, cooling unit, microchannel evaporators, evaporator, isolating unit, condenser, channels, or any combination thereof. The pressure regulator may be in fluid communication with at least one of the first fluid flow line, the second fluid flow lint, the liquid reservoir, the cooling unit, the microchannel evaporators, the evaporators, the isolating unit, the condenser, the flow generator, or any combination thereof. In an example, the system comprises multiple pressure regulators and each pressure regulator may be in fluid communication with multiple components of the system. The pressure regulate may control the flow rate of the liquid coolant or the vapor coolant. In an example, the pressure regulator may be a back pressure regulator or an equivalent electronic mechanism. The back pressure regulator may prevent coolant evaporation at low temperatures. Additionally, other fluid controlling components may be used in a self-regulating or controlled system. Fluid controlling components include, but are not limited to, flow restrictors (e.g., maze restrictors, orifices, expansion chambers, etc.), additional regulators, valves (e.g., check valves), or any combination thereof.

The thermal regulation method may comprise one or more control units. The control unit may control all aspects of the system or discrete portions of the system. The control unit may control the shut-off valve, the pressure regulator(s), the condenser, the flow generator, the vacuum generator, the heater, or any combination thereof. The control unit may be in electronic communication with one or more sensors. The one or more sensors may relay information to the control unit and the control unit may use the information from the sensors to alter or modify an aspect of the system. For example, if the fluid level in the liquid reservoir, cooling unit, microchannel evaporators, evaporator, or isolating unit reaches a lower threshold, a sensor may sense the level of the liquid coolant, relay the level information to the control unit, and the control unit may open the shut-off valve to increase the level of coolant.

The control unit may comprise a control loop. The control loop may actively control the pressure of the vapor coolant within the system (e.g., within the cooling unit, microchannel evaporators, evaporator, isolating unit, or the fluid flow line). In an example, the control loop controls the pressure of the vapor coolant in the cooling unit, microchannel evaporators, evaporator, or isolating unit when the cooling unit, microchannel evaporators, evaporator, or isolating unit is in thermal communication with an energy emitting device (e.g., energy storage device, cable, electronic device, etc.). The cooling loop may be in direct or indirect contact with the source of thermal energy (e.g., energy storage device, electronic device, cable, etc.). The cooling unit, microchannel evaporators, evaporator, of isolating unit may be in direct or indirect contact with the energy emitting device. The control loop may control the pressure and, therefore, the boiling point of the liquid coolant. Controlling the boiling point of the liquid coolant may, in turn, control the temperature of the energy emitting device (e.g., energy storage device, cable, electronic device, etc.). The control loop may actively control the pressure via a maze restrictor, a vacuum inducing device (e.g., vacuum pump), pressure inducing device, a controlled release valve (e.g, shut-off valve), or any combination thereof. The maze restrictor may be a restrictor with a tortuous or winding fluid flow path that is longer than the length of the restrictor. Controlling the pressure of the vapor coolant may control the boiling point of the coolant.

In an example, the control loop comprises a pressure generating device (e.g., shut-off valve or flow generator) and vacuum generating device (e.g., orifice, vacuum pump, etc.). The control loop may generate 1, 2, 3, 4, 5, 8, 10 or more pressure zones within the fluid flow path. The multiple pressure zones may permit active heat pumping. The multiple pressure zones may permit the thermal regulation system to reduce a temperature of the source of thermal energy below the temperature of the surroundings (e.g., ambient temperature). For example, the pressure at the condenser may be higher than the pressure in the control unit, microchannel evaporators, evaporator, isolating unit, or fluid flow channel. The pressure zones may be generated by a flow generator, vacuum generator, one or more valves, restriction devices (e.g., one or more orifices), pressure regulators, or any combination thereof. In an example, the fluid flow path comprises two pressure zones. In one pressure zone (e.g., a condensing zone), the coolant may undergo a phase transition from a vapor coolant to a liquid coolant (e.g., condensing portion of the fluid flow path). In the condensing zone, thermal energy may be emitted from the coolant to the surroundings. In another pressure zone (e.g., evaporating zone), the coolant may undergo a phase transition from a liquid coolant to a vapor coolant (e.g., vaporizing portion of the fluid flow path). In the evaporating zone, thermal energy may be absorbed from a source of thermal energy (e.g., electronic device, energy storage device, etc.) to the coolant. The pressure in the evaporating zone may be lower than the pressure in the condensing zone. For example, the pressure in the evaporating zone may be less than or equal to about 90%, 80%, 70%, 60%, 50%, 40%, 30%, 25%, 20%, 15%, 10%, 5%, 4%, 3%, 2%, 1%, or less than the pressure in the condensing zone. The control loop may be in communication with one or more sensors and may modulate the pressure based on energy storage device charge level, temperature of the energy storage device, cells, or cables, or ambient temperature. The control loop may be in communication with any of the sensors disclosed herein and may use information from the sensors to modulate the pressure of the vapor coolant.

The method may comprise using at least one sensor. The sensor may permit the thermal regulation system to sense that the temperature of either the heat source or the surroundings has exceeded predetermined temperature (e.g., a temperature at which the heat source may be damaged, function inefficiently, or become inoperable). The sensors may sense the charge level of the energy storage device or individual cells of the energy storage device. The sensors may sense the temperature of the energy storage device, individual cell, changing and discharging cables, or other electronic components. The sensors may sense the ambient temperature around the energy storage device, cables, or other electronic components. In an example, the thermal regulation system is used to regulate the thermal energy of a hybrid or electric vehicle and the sensor senses the temperature or heating requirement of the passenger cabin. The sensor may send an alert, turn the thermal regulation system on, or increase the activity of the thermal regulation system by increasing work load, and/or execute an emergency shutdown of the heat source or the entire electronic system comprising the heat source. The control unit may use the information form the sensors to control the system.

The thermal regulation method may comprise using a thermostat. The thermostat may be used to activate the system and regulate thermal energy of an energy storage device, electronic device, or cable when the threshold temperature of the source of thermal energy or temperature of the surroundings has been reached. Operating the thermal regulation system when the threshold temperature has been reached and not when the threshold temperature has not been reached may increase efficiency of the system and reduce resource use (e.g., power).

The thermal regulation system may be installed in a car (e.g., a hybrid or electric car) or may be installed at a charging station for a car and the method may be performed in a car or at a charging station for a car. The system may comprise components that are internal to the car and external to the car. The energy storage device and any components contacting (e.g., the cooling unit, microchannel evaporators, or evaporators) may be internal to the car. The other system components (e.g., compressor, vacuum generator, flow generator, etc.) may be external to the car. In an example, all components of the system are internal to the car. The fluid flow lines may be connected to the system using quick disconnect connectors.

The thermal regulation system may be provided empty (e.g., without any coolant) and the method may include adding coolant to the system after installation of the system. The coolant may include alcohol, water, glycol, a salt solution, or any combination thereof. The coolant may be any fluid described herein. The coolant or cooling agent may vaporize at less than or equal to about 1 atm at a low temperature. The coolant may vaporize at a pressure of less than or equal to about 1 atm and a temperature between about 0° C. to about 40° C., about 0° C. to about 30° C., about 0° C. to about 20° C., about 0° C. to about 10° C., about 5° C. to about 25° C., about 10° C. to about 25° C., about 15° C. to about 25° C., or from about 5° C. to about 20° C. The coolant or cooling agent may vaporize at 25° C. at a pressure of from about 0 atm to about 1 atm, from about zero atm to about 0.8 atm, from about zero atm to about 0.5 atm, from about zero atm to about 0.3 atm, or from about zero atm to about 0.1 atm.

The amount of heat dissipated by the system may be dependent upon the coolant used, the flow rate of the coolant, the area of the heat exchange unit, and the temperature differential between the coolant and the heat source. The thermal regulation system may dissipate greater than or equal to about 50 watts per square centimeter (W/cm$^2$), 75 W/cm$^2$, 100 W/cm$^2$, 125 W/cm$^2$, 150 W/cm$^2$, 200 W/cm$^2$, 250 W/cm$^2$, 300 W/cm$^2$, 400 W/cm$^2$, 500 W/cm$^2$, or more. The temperature differential between the heat source and the coolant may be greater than or equal to about 1° C., 3° C., 5° C., 7° C., 10° C., 15° C., 20° C., 30° C., 40° C., 50° C., or more. The temperature differential between the heat source and the coolant may be less than or equal to about 50° C., 40° C., 30° C., 20° C., 15° C., 10° C., 7° C., 5° C., 3° C., 1° C., or less.

Computer Control Systems

Figure 8:
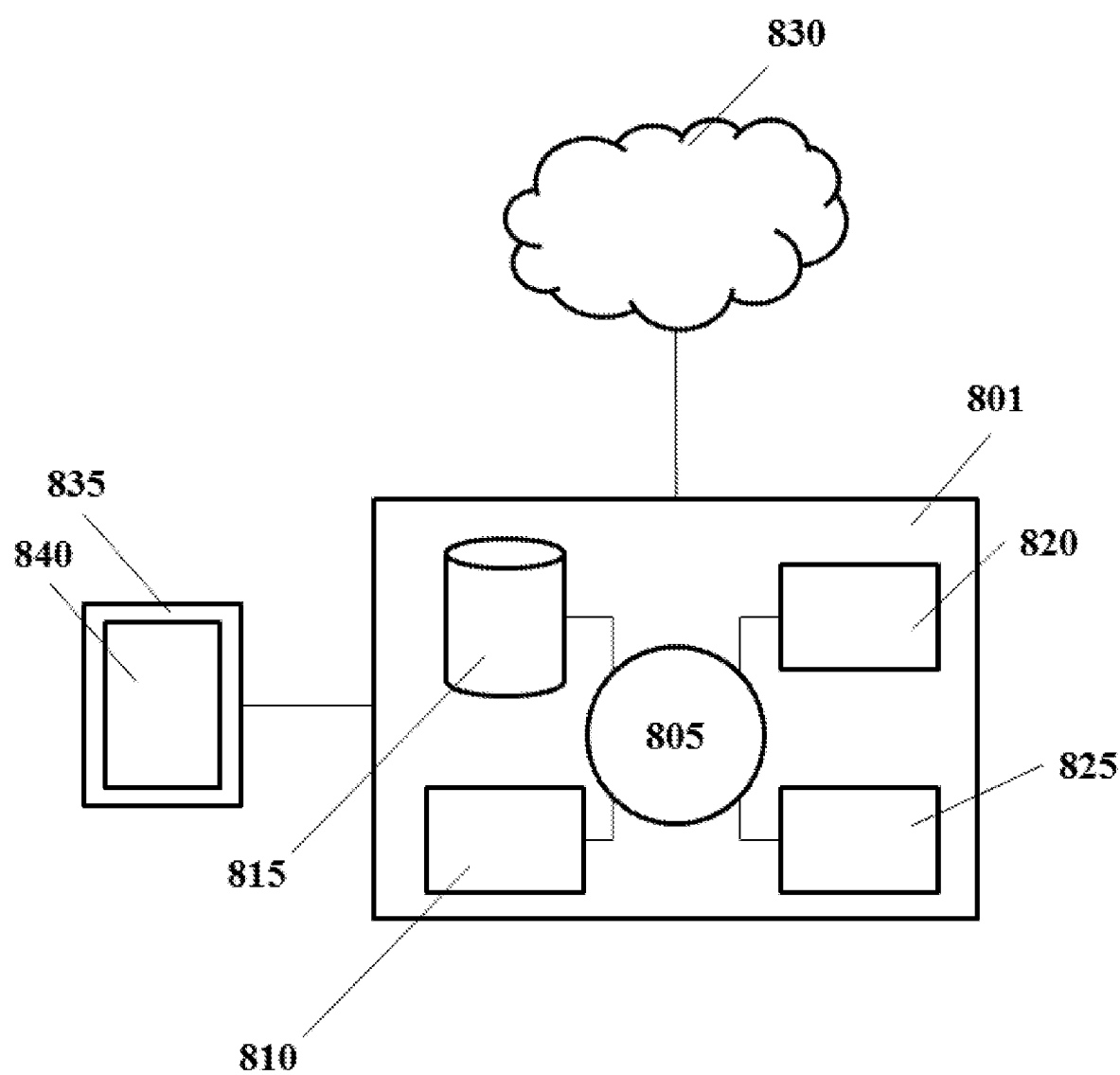
FIG. 8 shows a computer control system that is programmed or otherwise configured to implement methods provided herein.

The present disclosure provides computer control systems that are programmed to implement methods of the disclosure. FIG. 8 shows a computer system 801 that is programmed or otherwise configured to monitor and regulate temperature of an energy storage device (e.g., battery) or cable (e.g., charging cable). The computer system 801 can regulate various aspects of methods and systems of the present disclosure, such as, for example, controlling the flow of coolant through a thermal regulation or management system to regulate temperature. The computer system 801 can be an electronic device of a user or a computer system that is remotely located with respect to the electronic device. The electronic device can be a mobile electronic device.

The computer system 801 includes a central processing unit (CPU, also "processor" and "computer processor" herein) 805, which can be a single core or multi core processor, or a plurality of processors for parallel processing. The computer system 801 also includes memory or memory location 810 (e.g., random-access memory, read-only memory, flash memory), electronic storage unit 815 (e.g., hard disk), communication interface 820 (e.g., network adapter) for communicating with one or more other systems, and peripheral devices 825, such as cache, other memory, data storage and/or electronic display adapters. The memory 810, storage unit 815, interface 820 and peripheral devices 825 are in communication with the CPU 805 through a communication bus (solid lines), such as a motherboard. The storage unit 815 can be a data storage unit (or data repository) for storing data. The computer system 801 can be operatively coupled to a computer network ("network") 830 with the aid of the communication interface 820. The network 830 can be the Internet, an internet and/or extranet, or an intranet and/or extranet that is in communication with the Internet. The network 830 in some cases is a telecommunication and/or data network. The network 830 can include one or more computer servers, which can enable distributed computing, such as cloud computing. The network 830, in some cases with the aid of the computer system 801, can implement a peer-to-peer network, which may enable devices coupled to the computer system 801 to behave as a client or a server.

The CPU 805 can execute a sequence of machine-readable instructions, which can be embodied in a program or software. The instructions may be stored in a memory location, such as the memory 810. The instructions can be directed to the CPU 805, which can subsequently program or otherwise configure the CPU 805 to implement methods of the present disclosure. Examples of operations performed by the CPU 805 can include fetch, decode, execute, and writeback.

The CPU 805 can be part of a circuit, such as an integrated circuit. One or more other components of the system 801 can be included in the circuit. In some cases, the circuit is an application specific integrated circuit (ASIC).

The storage unit 815 can store files, such as drivers, libraries and saved programs. The storage unit 815 can store user data, e.g., user preferences and user programs. The computer system 801 in some cases can include one or more additional data storage units that are external to the computer system 801, such as located on a remote server that is in communication with the computer system 801 through an intranet or the Internet.

The computer system 801 can communicate with one or more remote computer systems through the network 830. For instance, the computer system 801 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 801 via the network 830.

Methods as described herein can be implemented by way of machine (e.g., computer processor) executable code stored on an electronic storage location of the computer system 801, such as, for example, on the memory 810 or electronic storage unit 815. The machine executable or machine readable code can be provided in the form of software. During use, the code can be executed by the processor 805. In some cases, the code can be retrieved from the storage unit 815 and stored on the memory 810 for ready access by the processor 805. In some situations, the electronic storage unit 815 can be precluded, and machine-executable instructions are stored on memory 810.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 801, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves, such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 801 can include or be in communication with an electronic display 835 that comprises a user interface (UI) 840 for providing, for example, system and temperature information. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 805. The algorithm can, for example, regulate systems or implement methods provided herein.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system for thermal regulation of an energy storage device, comprising:
    a liquid coolant reservoir configured to contain a liquid coolant;
    a cooling unit in fluid communication with said liquid coolant reservoir and thermal communication with said energy storage device comprising one or more cells, wherein said one or more cells are disposed internal to said cooling unit such that said one or more cells are at least partially submerged within said liquid coolant, and wherein said cooling unit is configured to permit transfer of thermal energy from said one or more cells to said liquid coolant such that at least a portion of said liquid coolant undergoes a phase transition to a vapor coolant;
    a fluid flow line in fluid communication with said cooling unit, wherein said fluid flow line is configured to accept said vapor coolant from said cooling unit;
    a condenser in fluid communication with said fluid flow line and said liquid coolant reservoir, wherein said condenser is configured to permit said vapor coolant to expel thermal energy and undergo phase transition to said liquid coolant;
    a control loop in fluid communication with said cooling unit and said fluid flow line, and wherein said control loop actively controls a pressure of said vapor coolant in said fluid flow line, and optionally generates a pressure differential between said cooling unit and said condenser such that a first pressure at said cooling unit is less than a second pressure at said condenser, a flow restrictor or shut-off valve in fluid communication with said liquid coolant reservoir and said condenser, and wherein said flow restrictor regulates flow of said liquid coolant from said condenser towards said liquid coolant reservoir; and a vacuum generator and a pump in fluid communication with said fluid flow line, wherein said vacuum generator regulates flow of said vapor coolant from said cooling unit to said condenser.

2. The system of claim 1, further comprising at least one of:

(a) a closed circulatory fluid flow path comprising said liquid coolant reservoir, cooling unit, fluid flow line, and condenser; and a heating element in thermal communication with said cooling unit, wherein said heating element provides thermal energy to said one or more cells.

3. The system of claim 1, wherein said one or more cells comprise gaps or spacers between individual cells of said one or more cells, and wherein, during use, said liquid coolant and/or said vapor coolant flows within said gaps or spacers.

4. The system of claim 1 for thermal regulation of an energy storage device, wherein said cooling unit is a plurality of microchannel evaporators.

5. The system of claim 4, further comprising at least one of:

(a) a closed circulatory fluid flow path comprising said liquid coolant reservoir, plurality of microchannel evaporators, fluid flow line, and condenser;

a heating element in thermal communication with said plurality of microchannel evaporators, wherein said heating element provides thermal energy to said one or more cells; and a control loop in fluid communication with said plurality of microchannel evaporators and said fluid flow line, and wherein said control loop actively controls a pressure of said vapor coolant in said fluid flow line, and optionally generates a pressure differential between said plurality of microchannel evaporators and said condenser such that a first pressure at said plurality of microchannel evaporators is less than a second pressure at said condenser.

6. The system of claim 4, wherein one or more microchannel evaporators of said plurality of microchannel evaporators are disposed between individual cells of said one or more cells.

7. The system of claim 1 for thermal regulation of an energy storage device, wherein said cooling unit is an evaporator configured to contain a liquid coolant and a vapor coolant, wherein;

said evaporator comprises a surface that is in thermal communication with one or more cells of said energy storage device, and is adjacent to a long dimension of said one or more cells, and said evaporator is configured to permit transfer of thermal energy from said one or more cells to said liquid coolant such that at least a portion of said liquid coolant in said evaporator undergoes a phase transition to yield a vapor coolant in a space adjacent to said liquid coolant and disposed away from said surface.

8. The system of claim 7, further comprising a heating element in thermal communication with said evaporator, wherein said heating element provides thermal energy to said one or more cells.

9. A system for thermal regulation of one or more heat emitting devices, comprising:

one or more restrictors configured to restrict a flow of a liquid coolant through said one or more restrictors;

one or more cooling interfaces in fluid communication with said one or more restrictors and thermal communication with one or more heat emitting devices, wherein said one or more cooling interfaces are configured to permit transfer of thermal energy from said one or more heat emitting devices to said liquid coolant such that at least a portion of said liquid coolant undergoes a phase transition to a vapor coolant;

a fluid flow line in fluid communication with said one or more cooling interfaces and said one or more restrictors, wherein said fluid flow line is configured to accept said vapor coolant from said one or more cooling interfaces; and a condenser in fluid communication with said fluid flow line and said one or more restrictors, wherein said condenser is configured to permit said vapor coolant to expel thermal energy and undergo phase transition to said liquid coolant.

10. The system of claim 9, wherein: (i) said one or more cooling interfaces and said condenser are part of a control loop that provides a pressure differential between said one or more cooling interfaces and said condenser such that a first pressure at said one or more cooling interfaces is less than a second pressure at said condenser;

or (ii) said one or more cooling interfaces are arranged in a parallel configuration.

* * * * *